(12) United States Patent
Matsuda

(10) Patent No.: US 9,227,603 B2
(45) Date of Patent: Jan. 5, 2016

(54) TRACTION CONTROL SYSTEM IN A VEHICLE, VEHICLE INCLUDING TRACTION CONTROL SYSTEM, AND TRACTION CONTROL METHOD

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 230 days.

(21) Appl. No.: 13/187,361

(22) Filed: Jul. 20, 2011

(65) Prior Publication Data

US 2012/0022761 A1 Jan. 26, 2012

(30) Foreign Application Priority Data

Jul. 21, 2010 (JP) ................................. 2010-163664

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |
| *B60T 8/175* | (2006.01) |
| *B60T 8/17* | (2006.01) |

(52) U.S. Cl.
CPC ............. *B60T 8/175* (2013.01); *B60T 8/1706* (2013.01)
USPC ............................................ 701/87; 701/85

(58) Field of Classification Search
CPC ... B60K 28/16; B60K 31/04; B60W 2520/26; B60W 2720/30
USPC ................................................... 701/87, 85
See application file for complete search history.

(56) References Cited

U.S. PATENT DOCUMENTS

| | | | |
|---|---|---|---|
| 4,886,140 A | 12/1989 | Leiber et al. | |
| 5,644,488 A | 7/1997 | Ito et al. | |
| 6,549,840 B1 * | 4/2003 | Mikami et al. | 701/69 |

(Continued)

FOREIGN PATENT DOCUMENTS

| | | |
|---|---|---|
| JP | 05187282 A | 7/1993 |
| JP | 7103009 A | 4/1995 |

(Continued)

OTHER PUBLICATIONS

European Patent Office, Extended European Search Report of EP11174538.6, Germany, Jul. 23, 2013, 6 pages.

*Primary Examiner* — Behrang Badii
*Assistant Examiner* — Daniel L Greene
(74) *Attorney, Agent, or Firm* — Alleman Hall McCoy Russell & Tuttle LLP

(57) ABSTRACT

A traction control system in vehicle comprises a detector for detecting a monitored value which changes according to a degree of a drive wheel slip; a condition determiner for determining whether or not the monitored value meets a control start condition and whether or not the monitored value meets a control termination condition; and a controller for executing traction control to reduce a driving power of the drive wheel during a period of time from when the condition determiner determines that the monitored value meets the control start condition until the condition determiner determines that the monitored value meets the control termination condition; the condition determiner being configured to set at least the control start condition variably based on a slip determination factor which changes according to a vehicle state and such that the control start condition changes more greatly according to the vehicle state than the control termination condition.

20 Claims, 16 Drawing Sheets

(56) References Cited

U.S. PATENT DOCUMENTS

| | | | |
|---|---|---|---|
| 6,650,987 B2 * | 11/2003 | Kogure et al. | 701/80 |
| 6,907,778 B2 * | 6/2005 | Kogure et al. | 73/146 |
| 2004/0015279 A1 * | 1/2004 | Barron et al. | 701/37 |
| 2008/0183353 A1 * | 7/2008 | Post et al. | 701/42 |
| 2008/0319626 A1 * | 12/2008 | Ogawa | 701/80 |
| 2009/0210128 A1 * | 8/2009 | Fujimoto et al. | 701/84 |
| 2009/0255746 A1 * | 10/2009 | Boesch | 180/197 |
| 2009/0326777 A1 * | 12/2009 | Oshima et al. | 701/83 |
| 2011/0257861 A1 * | 10/2011 | Uematsu | B60K 17/35 701/88 |

FOREIGN PATENT DOCUMENTS

| | | |
|---|---|---|
| JP | 07269385 A | 10/1995 |
| WO | 0240306 A1 | 5/2002 |

* cited by examiner

| FIRST | FIRST | SECOND | THIRD | FOURTH | FIFTH |
|---|---|---|---|---|---|
| PATTERN 1 | × | ○ | ○ | ○ | ○ |
| PATTERN 2 | × | × | ○ | ○ | ○ |

Fig.16

TRACTION CONTROL SYSTEM IN A VEHICLE, VEHICLE INCLUDING TRACTION CONTROL SYSTEM, AND TRACTION CONTROL METHOD

BACKGROUND OF THE INVENTION

1. Field of the Invention

The present invention relates to a traction control system built into a vehicle such as a motorcycle.

2. Description of the Related Art Japanese Laid-Open Patent Application Publication No. Hei. 7-103009 discloses a conventional traction control system in a vehicle. The conventional traction control system is configured to monitor a value indicating the degree to which a drive wheel slips. The degree to which the drive wheel slips tends to be high when a vehicle is driving on a road surface (hereinafter also referred to as a bad road surface) such as a rough road surface, or a slippery road surface which is wet due to rain or the like and has a low friction coefficient. It is expected that the monitored value increases as the degree to which the drive wheel slips increases. The traction control system determines whether or not the monitored value exceeds a threshold. When it is determined that the monitored value exceeds the threshold, the traction control system initiates traction control for reducing a driving power transmitted to the drive wheel to suppress a slip.

Conventionally, in some cases, the threshold is merely a predetermined value. In other cases, also, the threshold used to determine whether or not to initiate the traction control is the same as the threshold used to determine whether or not to terminate the traction control. Even in a case where the threshold used to determine whether or not to initiate the traction control and the threshold used to determine whether or not to terminate the traction control are set to different values, the two thresholds might merely have simple hysteresis. In principle, the traction control is used to suppress a slip. Therefore, during execution of the traction control, the monitored value is a suppressed value and the monitored value changes a little with time. For this reason, it is difficult to, using the above set values, correctly distinguish between a case where a slip is mitigated after the vehicle has exited a road of a bad road surface condition and a case where the vehicle is now driving on a bad road surface and a slip is suppressed effectively by the traction control. At a time point when the vehicle has exited the road of the bad road surface condition, the traction control should be terminated immediately. On the other hand, during driving on the bad road surface, the traction control should not be terminated. According to the conventional traction control system and technique, the traction control cannot be terminated desirably.

SUMMARY OF THE INVENTION

The present invention addresses the above conditions, and an object of the present invention is to properly determine whether or not to initiate traction control and to properly determine whether or not to terminate the traction control.

According to an aspect of the present invention, a traction control system in a vehicle comprises a detector for detecting a monitored value which changes according to a degree to which a drive wheel slips; a condition determiner for determining whether or not the monitored value detected by the detector meets a control start condition of traction control and whether or not the monitored value detected by the detector meets a control termination condition of the traction control; and a controller for executing the traction control to reduce a driving power of the drive wheel during a period of time from when the condition determiner determines that the monitored value meets the control start condition until the condition determiner determines that the monitored value meets the control termination condition; the condition determiner being configured to set at least the control start condition variably based on a slip determination factor which changes according to a vehicle state and set the control start condition and the control termination condition such that the control start condition changes more greatly according to the vehicle state than the control termination condition.

In accordance with this configuration, the control start condition changes more sensitively with respect to a change in the vehicle state than the control termination condition. In a case where the vehicle enters a road of a bad road surface condition, in a state where the traction control is not executed, the change in the vehicle state becomes great immediately thereafter. If the control start condition is insensitive to the change in the vehicle state, it cannot be detected correctly that the vehicle has entered the road of the bad road surface condition, and starting of the traction control might be delayed. Since the control start condition changes sensitively to the change in the vehicle state in the present embodiment, it can be determined properly whether or not to start the traction control adaptively to a situation where the traction control should be started. During the traction control, the change in the monitored value which changes according to the degree to which the drive wheel slips tends to decrease. If the control termination condition is sensitive to the change in the vehicle state, the traction control is terminated undesirably even though the vehicle is driving on a bad road surface, and the traction control might be thereafter started and terminated repeatedly. By setting the control termination condition as described above, it is possible to properly determine whether or not to terminate the traction control adaptively to a situation where the traction control should be terminated.

The slip determination factor may include a sensitive factor indicating a temporal difference value between instantaneous values of the vehicle state and an insensitive factor indicating an instantaneous value of the vehicle state or a temporal integration value of instantaneous values of the vehicle state; and the control start condition and the control termination condition may be set such that the control start condition is affected more greatly by the sensitive factor rather than the insensitive factor, than the control termination condition. The instantaneous value of the vehicle state may be at least one of an acceleration command value, a rotational speed of a driving power source, the monitored value, and a vehicle speed. The slip determination factor may include a sensitive factor indicating a difference between an instantaneous value and a past value of the vehicle state and an insensitive factor indicating an instantaneous value of the vehicle state or a delay calculation value using an instantaneous value and a past value of the vehicle state, and the control start condition may be set variably according to the sensitive factor and the control termination condition may be set variably according to the insensitive factor or to a constant value irrespective of a change in the vehicle state.

In accordance with this configuration, the control start condition includes the sensitive factor indicating a change rate of the vehicle state. Because of this, the control start condition responds and changes sensitively to the change in the vehicle state, and therefore, it can be determined properly whether or not to start the traction control, using the control start condition. In addition, the control termination condition includes the insensitive factor indicating the instantaneous value of the vehicle state or a delay calculation value using the instantaneous value and the past value of the vehicle state. Because of this, the control termination condition responds insensitively to or does not respond to the change in the vehicle state, and thus, it can be determined properly whether or not to terminate the traction control, using the control termination condition.

The control start condition may be a condition in which the monitored value is greater than or equal to a control start threshold; and the control start threshold may be set to decrease as a value of the sensitive factor increases.

In accordance with this configuration, since the control start threshold defined by the control start condition is reduced when the degree to which the drive wheel slips increases, the monitored value easily meets the control start condition. This makes it possible to start the traction control promptly in response to a situation where the vehicle state changes and the degree to which the drive wheel slips increases.

The controller may start the traction control when the monitored value is greater than or equal to a control permission threshold at which execution of the traction control is permitted and meets the control start condition.

In accordance with this configuration, in a situation where the monitored value is small and it is not necessary to execute the traction control, it is possible to prevent the traction control from being started undesirably. For example, in a situation where the driver performs an operation for accelerating the vehicle rapidly in a road surface condition which is not bad and thereby the drive wheel slips or skids on the road surface for a moment, it is possible to prevent the driving power transmitted to the drive wheel from being decreased undesirably.

The traction control system may further comprise a road surface condition determiner for determining whether a road surface condition is a first road surface condition or a second road surface condition in which the drive wheel is more likely to slip than in the first road surface condition, and the condition determiner may execute the traction control during a period of time from when the monitored value meets a first control start condition until the monitored value meets a first control termination condition when the road surface condition determiner determines that the road surface condition is the first road surface condition; the condition determiner may execute the traction control during a period of time from when the monitored value meets a second control start condition until the monitored value meets a second control termination condition when the road surface condition determiner determines that the road surface condition is the second road surface condition; and the first control termination condition may be set to change more greatly according to the vehicle state than the second control termination condition.

In accordance with this configuration, the control termination condition in a case where the vehicle is driving in a road surface condition in which the drive wheel is less likely to slip changes easily according to the vehicle state. The traction control can be terminated easily when the vehicle is driving in such a road surface condition. Thus, according to a road surface condition difference, it can be determined properly whether or not to terminate the traction control.

The controller may increase the driving power gradually with a lapse of time after the monitored value meets the control termination condition and then terminate the traction control. In accordance with this configuration, even in a case where the driving power at the time point when the monitored value meets the control termination condition is different from the driving power to be generated in accordance with, for example, normal control different from the traction control, the difference can be lessened gradually. This makes it possible to keep a state where the driver drives comfortably.

According to another aspect of the present invention, a vehicle comprises the above recited traction control system. In accordance with this vehicle, since it is determined properly whether or not to start the traction control and whether or not to terminate the traction control, the vehicle can drive while transmitting a driving power adaptive to the road surface condition to the drive wheel.

According to another aspect of the present invention, a traction control method comprises: detecting a monitored value which changes according to a degree to which a drive wheel slips; determining whether or not the monitored value detected in the detecting step meets a control start condition of traction control and whether or not the monitored value detected in the detecting step meets a control termination condition of the traction control; and executing the traction control to reduce a driving power of the drive wheel during a period of time from when it is determined that the monitored value meets the control start condition in the determination step until it is determined that the monitored value meets the control termination condition in the determination step; wherein in the determination step, at least the control start condition is set variably based on a slip determination factor which changes according to a vehicle state; the slip determination factor including a sensitive factor indicating a temporal difference value between instantaneous values of the vehicle state and an insensitive factor indicating an instantaneous value of the vehicle state or a temporal integration value of instantaneous values of the vehicle state; and the control start condition and the control termination condition are set such that the control start condition is affected more greatly by the sensitive factor rather than the insensitive factor, than the control termination condition.

In accordance with this method, the control start condition changes sensitively in response to a change in the vehicle state, and thus, it is possible to properly determine whether or not to start the traction control using the control start condition. In addition, the control termination condition responds insensitively to or does not respond to the change in the vehicle state, and thus, it can be determined properly whether or not to terminate the traction control using the control termination condition.

The above and further object and features of the invention will more fully be apparent from the following detailed description with accompanying drawings.

BRIEF DESCRIPTION OF THE DRAWINGS

FIG. 16 is a view showing an ignition skip pattern in ignition skip control.

DETAILED DESCRIPTION OF THE PREFERRED EMBODIMENTS

Hereinafter, a motorcycle 1 including a traction control system 18 according to embodiments of the present invention will be described with reference to the drawings. The stated directions are referenced from the perspective of a driver riding on the motorcycle 1 unless otherwise explicitly noted.

Figure 1:
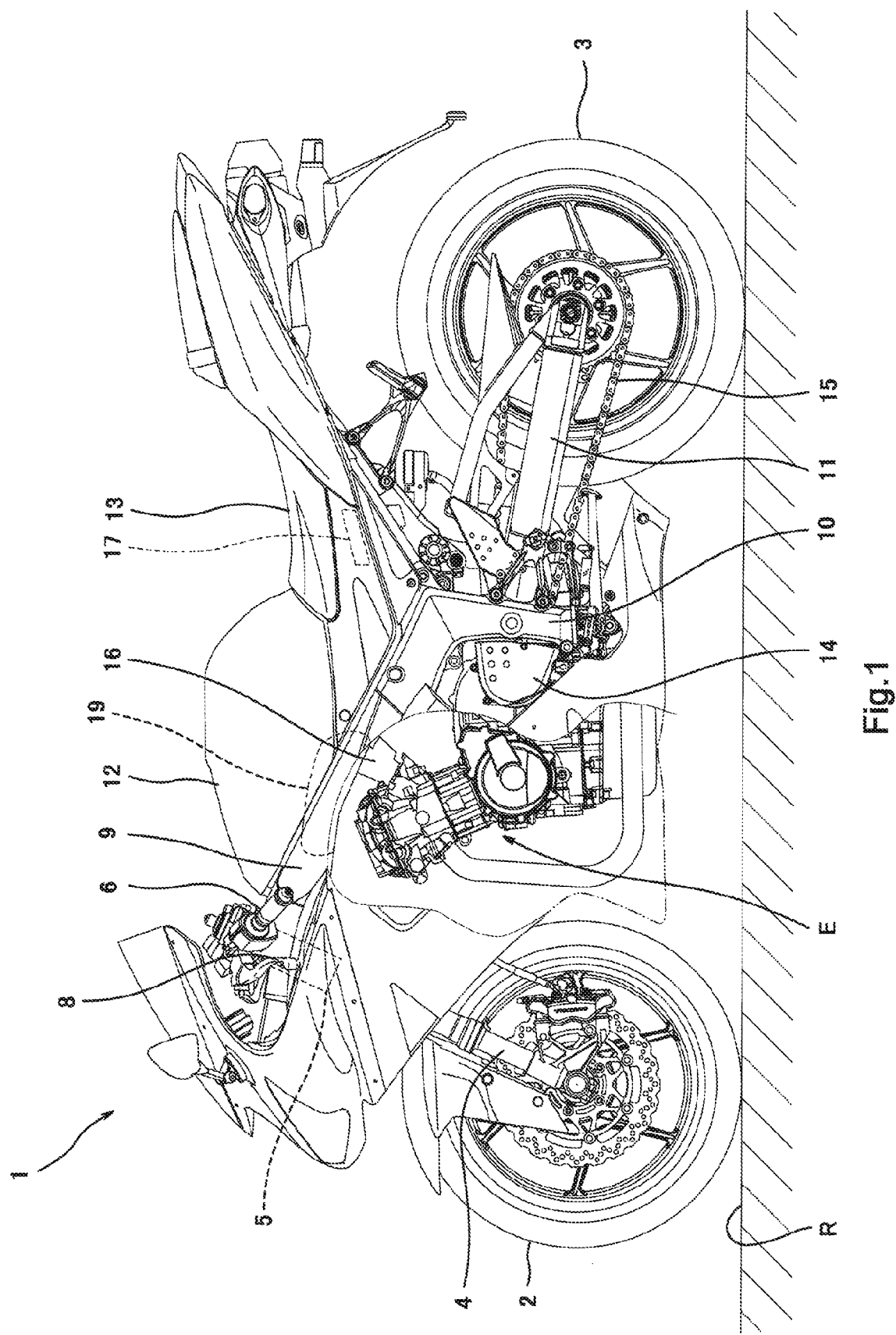
FIG. 1 is a left side view of a motorcycle which is an exemplary vehicle including a traction control system according to an embodiment of the present invention.

FIG. 1 is a left side view of the motorcycle 1 including the traction control system 18 according to Embodiment 1 of the present invention. As shown in FIG. 1, the motorcycle 1 includes a front wheel 2 which is a driven wheel and a rear wheel 3 which is a drive wheel. The front wheel 2 is rotatably mounted to a lower end portion of a front fork 4 extending substantially vertically. The front fork 4 is mounted to a steering shaft (not shown) via an upper bracket provided at an upper end portion thereof and an under bracket (not shown) provided below the upper bracket. The steering shaft is rotatably supported by a head pipe 5. A bar-type steering handle 6 extending rightward and leftward is attached to the upper bracket.

A throttle grip 7 (see FIG. 2) of the handle 6 is gripped by the driver's right hand and rotated by the right hand to operate a throttle device 16 as described later. The throttle grip 7 is a throttle input device. A clutch lever 8 is provided in front of a grip of the handle 6 which is gripped by the driver's left hand. When the driver rotates the handle 6, the front wheel 2 can be turned in a desired direction around the steering shaft.

A pair of right and left frame members 9 extend from the head pipe 5 rearward to be tilted in a slightly downward direction. A pair of right and left pivot frame members 10 are coupled to rear portions of the main frame members 9, respectively. The front end portions of swing arms 11 extending substantially in the longitudinal direction of the motorcycle 1 are coupled to the pivot frame members 10, respectively such that each swing arm 11 is pivotable around the front end portion. The rear wheel 3 is rotatably mounted to rear end portions of the swing arms 11. A fuel tank 12 is disposed behind the handle 6. A straddle-type seat 13 is provided behind the fuel tank 12.

Between the front wheel 2 and the rear wheel 3, an inline four-cylinder engine E is mounted to the main frame members 9 and to the pivot frame members 10. A transmission 14 is coupled to the engine E. A driving power output from the transmission 14 is transmitted to the rear wheel 3 via a chain 15. The throttle device 16 is disposed inward relative to the main frame members 9 and coupled to intake ports (not shown) of the engine E. An air cleaner 19 is disposed below the fuel tank 12 and coupled to an upstream side of the throttle device 16. The air cleaner 19 is configured to take in outside air by utilizing a wind from forward. In an inner space below the seat 13, an engine electronic control unit (ECU) 17 for controlling the throttle device 16, an ignition device 26 (see FIG. 2), and an injector 31 (see FIG. 2) are accommodated.

Figure 2:
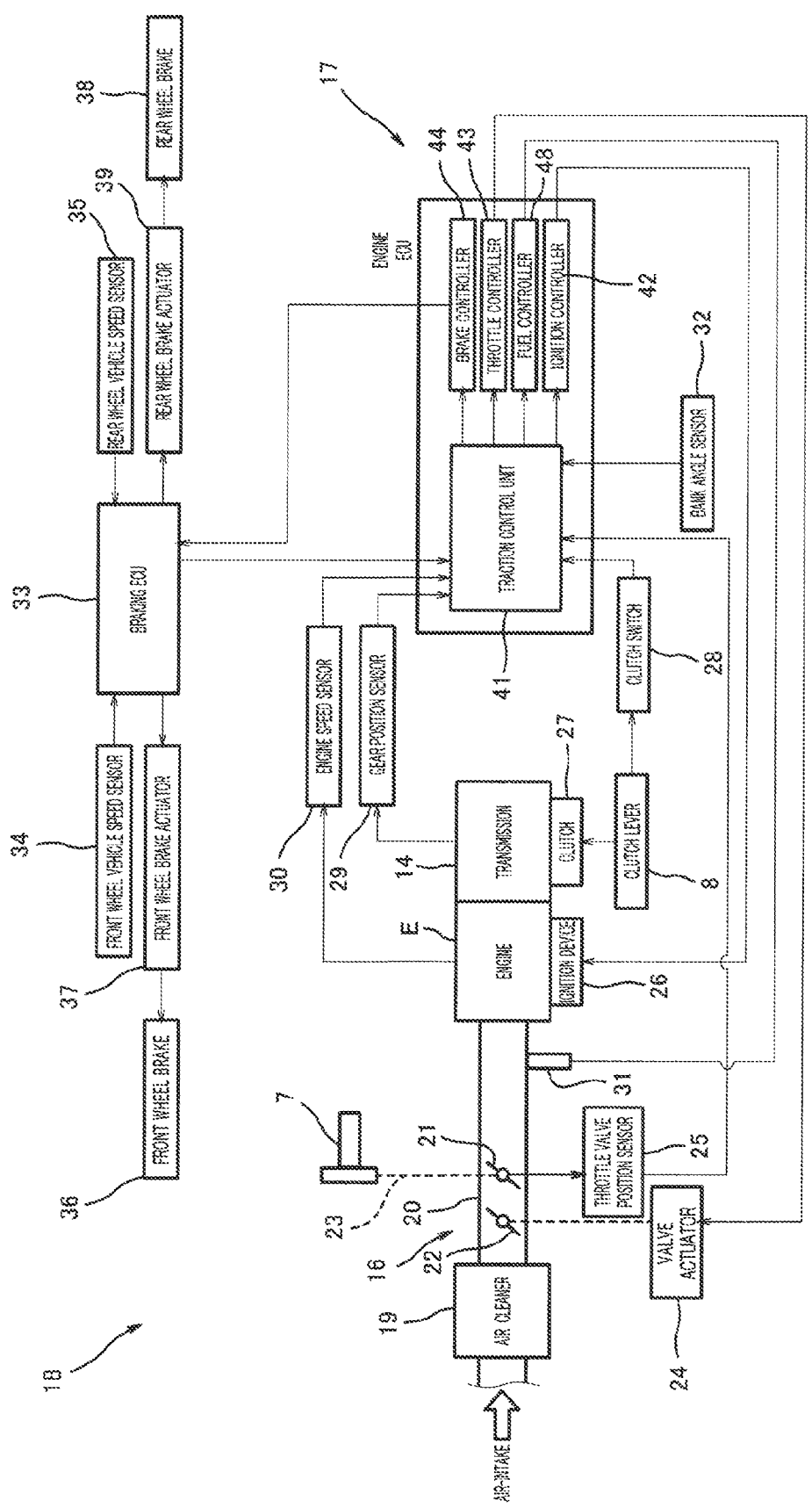
FIG. 2 is a block diagram showing the overall traction control system in the motor cycle of FIG. 1.

FIG. 2 is a block diagram showing the overall traction control system 18 of Embodiment 1 in the motorcycle 1 of FIG. 1. As shown in FIG. 2, the traction control system 18 includes the throttle device 16 including an air-intake pipe 20, a main throttle valve 21 disposed at a downstream side of the air-intake pipe 20, and a sub-throttle valve 22 disposed upstream of the main throttle valve 21 in the air-intake pipe 20. The main throttle valve 21 is coupled to the throttle grip 7 via a throttle wire 23 and is actuated by the driver's operation of the throttle grip 7 to open and close an air-intake passage inside the air-intake pipe 20. The main throttle valve 21 is provided with a throttle valve position sensor 25 for detecting an opening degree of the main throttle valve 21. Since the main throttle valve 21 is operative mechanically with the operation of the throttle grip 7, it functions as a throttle device operation amount detector for detecting an operation amount or operation position of the throttle grip 7.

The sub-throttle valve 22 is coupled to a valve actuator 24 which is constituted by a motor controlled by the engine ECU 17 and driven by the valve actuator 24 to open and close the air-intake passage. The throttle device 16 is provided with an injector 31 for injecting a fuel to the air-intake passage. The engine E is attached with ignition devices 26 for igniting an air-fuel mixture inside the four cylinders. The engine E is attached with an engine speed sensor 30 for detecting an engine speed. The engine E is coupled to the transmission 14 for changing the speed of the driving power of the engine E and transmitting the resulting driving power to the rear wheel 3. The transmission 14 is provided with a clutch 27 engaged/disengaged to permit/inhibit transmission of the engine driving power to the rear wheel 3.

The clutch 27 is disengaged to inhibit the driving power from being transmitted when the driver pulls the clutch lever 8. The clutch lever 8 is attached with a clutch switch 28 for detecting whether or not the clutch lever 8 is operated by the driver. The transmission 14 is attached with a gear position sensor 29 for detecting a transmission gear position.

The traction control system 18 includes a braking electronic control unit 33 (braking ECU) used in a known combined braking system (CBS). The braking ECU 33 controls CBS or an antilock braking system (ABS) and includes a front wheel speed sensor 34 for detecting a rotational number and rotational speed of the front wheel 2 and a rear wheel speed sensor 35 for detecting a rotational number and rotational speed of the rear wheel 3. A front wheel brake actuator 37 for actuating a front wheel brake 36 and a rear wheel brake actuator 39 for actuating a rear wheel brake 38, are coupled to the braking ECU 33. The traction control system 18 includes a bank angle sensor 32 for detecting right and left bank angles of a vehicle body of the motorcycle 1.

The engine ECU 17 is coupled to the throttle valve position sensor 25, the clutch switch 28, the gear position sensor 29, the engine speed sensor 30, the bank angle sensor 32, and the braking ECU 33. The engine ECU 17 includes a traction control unit 41, an ignition controller 42, a fuel controller 48, a throttle controller 43, and a brake controller 44. The traction control unit 41 performs calculations relating to the traction control based on signals received from the sensors 25, 29, 30, 32, and 33 and the switch 28. The ignition controller 42 controls the ignition device 26 based on a result of the calculation performed by the traction control unit 41. The fuel controller 48 controls the injector 31 based on a result of the calculation performed by the traction control unit 41. The throttle controller 43 actuates the valve actuator 24 based on a result of the calculation performed by the traction control unit 41 to control the opening degree of the sub-throttle valve 22. The brake controller 44 transmits a brake actuation signal to the braking ECU 33 based on a result of the calculation performed by the traction control unit 41.

Figure 3:
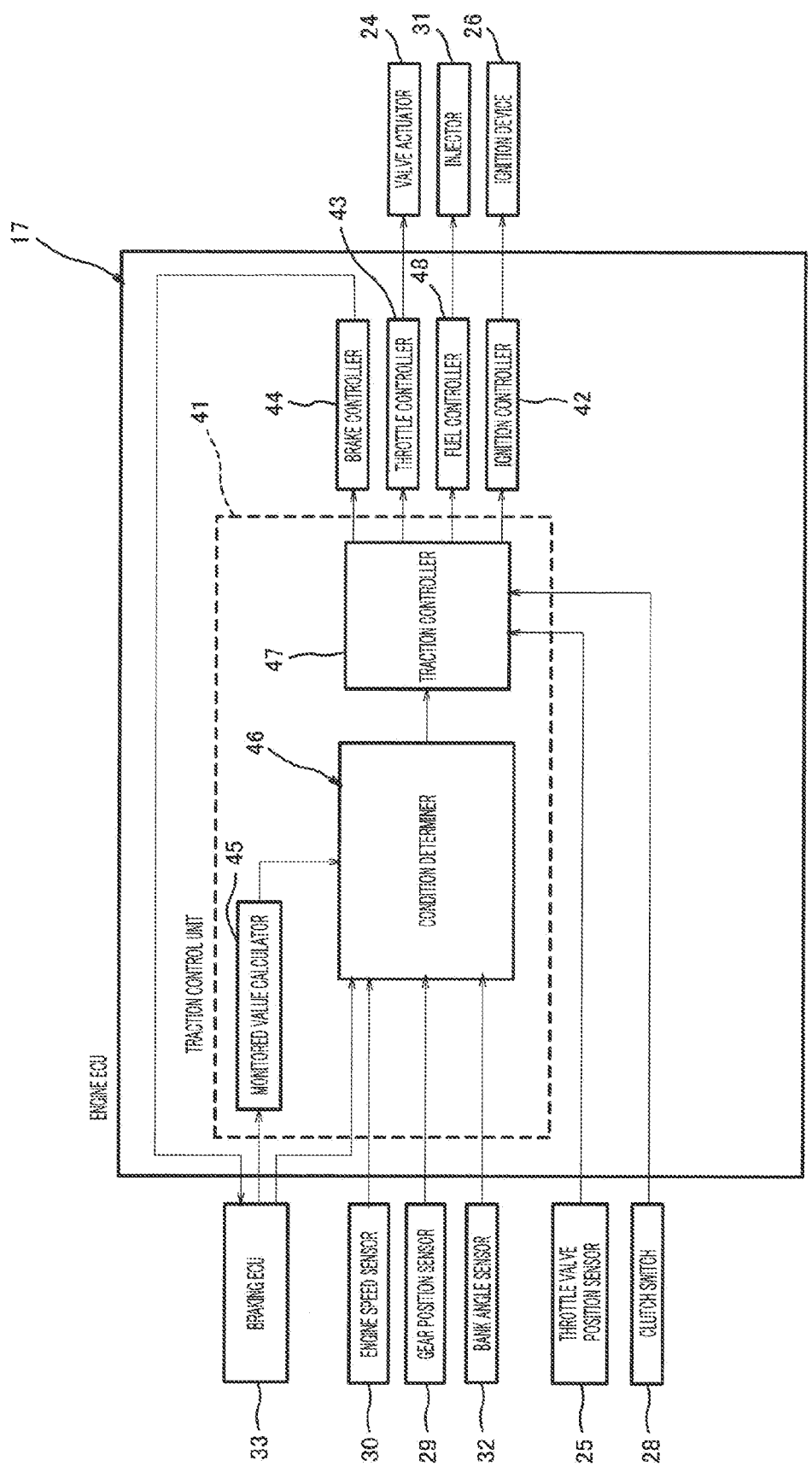
FIG. 3 is a block diagram showing major components in the traction control system of FIG. 2.

FIG. 3 is a block diagram mainly showing major components in the engine ECU 17 in the traction control system 18 of FIG. 2. As shown in FIG. 3, the traction control unit 41 in the engine ECU 17 includes a monitored value calculator 45, a condition determiner 46 and a traction controller 47.

The monitored value calculator 45 sequentially calculates a monitored value M according to a spin amount of the rear wheel 3, which is the drive wheel, based on information received from the braking ECU 33. The monitored value M is calculated according to, for example, the following formula (1):

$$\text{Monitored value } M = (VR - VF)/VR \quad (1)$$

In the formula (1), VF is a front wheel speed derived from a front wheel rotational speed RF detected by the front wheel speed sensor 34, VR is a rear wheel speed derived from a rear wheel rotational speed RR detected by the rear wheel speed sensor 35, and the formula (1) is used to calculate a slip ratio. The front wheel speed sensor 34, the rear wheel speed sensor 34, the braking ECU 33, and the monitored value calculator 45 constitute a detector for detecting the monitored value M.

Although in the present embodiment, the slip ratio which is a value corresponding to the difference between the rotational speed of the front wheel 2 and the rotational speed of the rear wheel 3 is sequentially calculated as the monitored value M, the monitored value M is not limited to the value calculated according to the formula (1) so long as it changes according to the degree to which the drive wheel 3 slips. For example, the monitored value M may be a slip ratio calculated according to another formula, for example, a speed difference (VR−VF) between the front wheel 2 and the rear wheel 3, a value obtained by dividing this speed difference by the front wheel speed ((VR−VF)/VF), a rotational speed difference (RR−RF) between the front wheel 2 and the rear wheel 3, a value obtained by dividing this rotational speed difference by the front wheel rotational speed (RR−RF)/RF, or a value obtained by dividing this rotational speed difference by the rear wheel rotational speed (RR−RF)/RR. Alternatively, the monitored value M may be a difference (RR−V) between the rear wheel speed RR and the vehicle speed V, a change rate Δ(VR−VF) of the speed difference between the front wheel 2 and the rear wheel 3, a change rate Δ(RR−RF) of the rotational speed difference between the front wheel 2 and the rear wheel 3, a change rate ΔNE of the engine speed NE, a change rate ΔRR of the rear wheel rotational speed RR, a change rate of the rotational speed of a component in a driving system coupling the rear wheel 3 to the engine E, a change rate of the slip ratio, etc. As used herein, the term "change rate" refers to a value obtained by dividing a difference between two values measured in a passage of a predetermined period of time by the predetermined period of time.

The condition determiner 46 determines whether or not the monitored value M calculated as described above meets the control start condition. If it is determined that the monitored value M meets the control start condition, the condition determiner 46 determines that there may be a chance that the rear wheel 3 is about to spin with respect to a road surface R undesirably and therefore, the driving power to be transmitted to the rear wheel 3 should be reduced. To be specific, the control start condition is represented by the following formula (2):

$$\text{Monitored value } M \geq \text{control start threshold } MS \quad (2)$$
$$= KSTh \times Th + KSdTh \times \Delta Th + KSdNE \times$$
$$(-\Delta NE) + KSdSL \times (-\Delta SL) +$$
$$KSAcc \times Acc + \alpha S$$

In the formula (2), Th, NE, SL, and Acc are state-relating values indicating the states of the motorcycle 1. Th is the opening degree of the main throttle valve 21. ΔTh is a change rate of the opening degree of the main throttle valve 21 which occurs for a predetermined period of time. NE is an engine speed. ΔNE is a change rate of the engine speed which occurs for a predetermined period of time. The engine speed may be replaced by the rotational speed of the driving system. SL is the slip ratio (e.g., SL=(VR−VF)/VR). ΔSL is a change rate of the slip ratio. Acc is a change rate of the vehicle speed V of the motorcycle 1 which occurs for a predetermined period of time, i.e., acceleration. αS is a predetermined constant. ΔTh, ΔNE, ΔSL and Acc are parameters that vary according to the change rates. These variable parameters are not necessarily the change rates, but may be, for example, a difference between a current value and a past value, i.e., temporal difference value between instantaneous values of the vehicle state, so long they change according to the change rates. The same applies to the formulas as described later.

KSTh, KSdTh, KSdNE, KSdSL, and KSAcc are weighting coefficients with respect to Th, ΔTh, ΔNE, ΔSL, and Acc, respectively, and are set according to the driving state or engine running state, for example, at least one from among Th, NE, SL, the vehicle speed V of the motorcycle 1, the bank angle of the vehicle body, etc., which are obtained by the sensors 25, 29, 30, 32, and 33. The condition determiner 46 contains a map relating to the weighting coefficients KSTh, KSdTh, KSdNE, KSdSL, and KSAcc and is configured to select or calculate the weighting coefficients KSTh, KSdTh, KSdNE, KSdSL, and KSAcc from the map based on the information obtained from the sensors 25, 29, 30, 32 and 33.

The condition determiner 46 sets the control start condition variably based on the plurality of vehicle states Th, NE SL, ΔTh, ΔNE, ΔSL, and Acc which change according to the vehicle state, as slip determination factors. Among these slip determination factors, ΔTh, ΔNE, ΔSL, and Acc are more likely to be affected by a change rate of the vehicle state per unit time and are sensitive to a change in the vehicle states. Th, NE, and SL indicate state values of the vehicle states and are insensitive to a change in the vehicle states.

Each sensitive factor corresponds to a temporal difference value between instantaneous values of the vehicle state changing over time, i.e., a difference between a current value and a past value which may be different from each other according to the change in the vehicle state. The sensitive factors include factors that change sensitively in particular to a fluctuation in the degree to which the drive wheel 3 slips. In this embodiment, the sensitive factors are, for example, ΔSL and ΔNE. The insensitive factors are current values (instantaneous values) of the vehicle states themselves. Furthermore, the insensitive factors include a temporal-integration value of instantaneous values of the vehicle state, for example, a delay calculation value derived by delay calculation using a current value (instantaneous value) and a past value which may be different from each other according to the change in the vehicle state. The delay calculation value includes an integrated value and a moving average value. When the insensitive factor is derived by the delay calculation, responsiveness of the factor to a change in the vehicle state can be further made lower while taking this change into account.

In accordance with the formula (2), the control start threshold MS is set to decrease as the values of $\Delta$SL and $\Delta$NE which change sensitively to a fluctuation in the degree of the slip increases. It should be noted that the formula for deriving the control start threshold MS includes a constant term $\alpha$S. The constant term $\alpha$S is set to prevent the control start threshold MS from decreasing in excess even when the values of $\Delta$SL and $\Delta$NE increase.

The condition determiner 46 determines whether or not the monitored value M meets a control termination condition after the monitored value M meets the control start condition. If the monitored value M meets the control termination condition, the condition determiner 46 determines that the undesirable spin of the rear wheel 3 with respect to the road surface R is more likely to finish, and therefore the driving power to be transmitted to the rear wheel 3 should be restored. To be specific, the control termination condition is represented by the following formula (3):

$$\text{Monitored value } M < \text{control termination threshold} \\ ME = KETh \times Th + \alpha E \qquad (3)$$

$\alpha$E is a predetermined constant different from $\alpha$S in the formula (2). A weighting coefficient KETh is a weighting coefficient with respect to the throttle value opening degree Th, which is different from the weighting coefficient KSTh in the formula (2), and is set according to at least one value from among Th, NE, SL, the vehicle speed V of the motorcycle 1, the bank angle, etc., which are obtained from the sensors 25, 29, 30, 32, and 33. The condition determiner 46 contains a map relating to the weighting coefficient KETh, and is configured to select or calculate the weighting coefficient KETh from the map based on the information obtained from the sensors 25, 29, 30, 32 and 33. The weighting factor KETh is set to a value different from a value of the weighting factor KSTh. Thus, the control termination condition is set using only the insensitive factors among the slip determination factors.

The weighting coefficients KSTh, KSdTh, KSdNE, KSdSL, KSAcc, and KETh may be set based on another driving state or engine running state, for example, the gear position of the transmission 14, the front wheel speed VF, the rear wheel speed VR, the brake pressure, etc. Although in the present embodiment, the weighting coefficients KSTh, KSdTh, KSdNE, KSdSL, KSAcc, and KETh are decided based on the driving state or the engine running state, they may be predetermined fixed values irrespective of the driving state or the engine running state.

As should be understood from the above description, the control start condition and the control termination condition are set using different calculation formulas. The control start condition and the control termination condition are independent of each other and do not interfere with each other. The control start condition and the control termination condition may be set by another method so long as the control start condition and the control termination condition are independent of each other and the control start condition changes more greatly (with a higher rate) than the control termination condition, according to a change in the vehicle state.

The formula (2) need not include all of the sensitive factors $\Delta$Th, $\Delta$NE, $\Delta$SL and Acc but may include, for example, at least one of $\Delta$Th, $\Delta$NE, $\Delta$SL and Acc. In addition, the value of the term relating to the factor that changes sensitively to the degree of the slip need not decrease as the degree of the slip increases. That is, the control start condition may be represented by the following formula (4):

$$\text{Monitored value } M \geq \text{control start threshold } MS \qquad (4)$$
$$= KSdNE \times \Delta NE + \alpha S$$

The formula (2) does not necessarily include the sensitive factors. If the formula (2) does not include the sensitive factors, it is desirable to set a value of the weighting coefficient in the formula of the control start condition greater than a value of the weighting coefficient in the formula of the control termination condition, to render the control start condition sensitive to a change in the vehicle state. For this purpose, the control start condition may include more slip determination factors than the control termination condition. If the number of the slip determination factors and/or the number of sensitive factors is/are different between the control start condition and the control termination condition, identical weighting coefficients may be used in the control start condition and the control termination condition.

The first variable threshold M1 and the second variable threshold M2 are not limited to the above $\Delta$Th, $\Delta$NE, $\Delta$SL and Acc, but may be set variably based on whether or not a brake is actuated, whether or not a clutch is operated, an operation amount of the throttle grip 7, a change rate of the operation amount of the throttle grip 7, a steering angle, a change rate of the steering angle, a bank angle, a change rate of the bank angle, etc., so long they are set based on the state-relating values of the motorcycle 1.

The control start condition and the control termination condition may be functions or data bases, and their forms are not particularly limited. The control termination condition may be set not to change according to the vehicle state. In other words, the control termination condition ME may be a constant value.

The condition determiner 46 determines whether or not the slip ratio is greater than a control permission threshold pre-stored in a memory. In the present embodiment, the monitored value M corresponds to the slip ratio, and therefore, the condition determiner 46 determines whether or not the slip ratio is greater than the control permission threshold, using the monitored value M calculated in the monitored value calculator 45. The control permission threshold is set according to the gear position in the transmission 14. The condition determiner 46 sets the control permission threshold based on the transmission gear position obtained by the gear position sensor 29 and compares this control permission threshold to the calculated slip ratio.

Furthermore, the condition determiner 46 determines whether or not the monitored value M meets a control inhibiting determination condition. If it is determined that the monitored value M meets the control inhibiting determination condition, the condition determiner 46 determines that the monitored value M is an unexpected value (a value which is beyond a scope of assumption), due to a failure of the sensors 25, 29, 30, 32, and 33, and other reasons. The control inhibiting determination condition is defined as, for example:

"the monitored value M exceeds a predetermined constant δ." The predetermined constant δ is a value greater than a value which could change as the control start threshold MS.

As described later, the traction controller 47 executes the traction control for reducing the driving power transmitted to the drive wheel 3 based on a result of the determination performed by the condition determiner 46. In the traction control, the traction controller 47 decides values of a retard amount of the ignition timing, a fuel injection amount, a reduction amount of air-intake, an operation amount of the rear wheel brake actuator 39, etc., based on a result of the determination performed by the condition determiner 46, and outputs these values as commands to corresponding ones of the ignition controller 42, the fuel controller 48, the throttle controller 43 and the brake controller 44. In accordance with the commands from the traction controller 47, the ignition controller 42 controls the igniter 26, the fuel controller 48 controls the injector 31, the throttle controller 43 controls the valve actuator 24, and the brake controller 44 controls the rear wheel brake 38. Hereinafter, the traction control or the like will be described more specifically with reference to the flowcharts of FIGS. 4 and 5.

Figure 4:
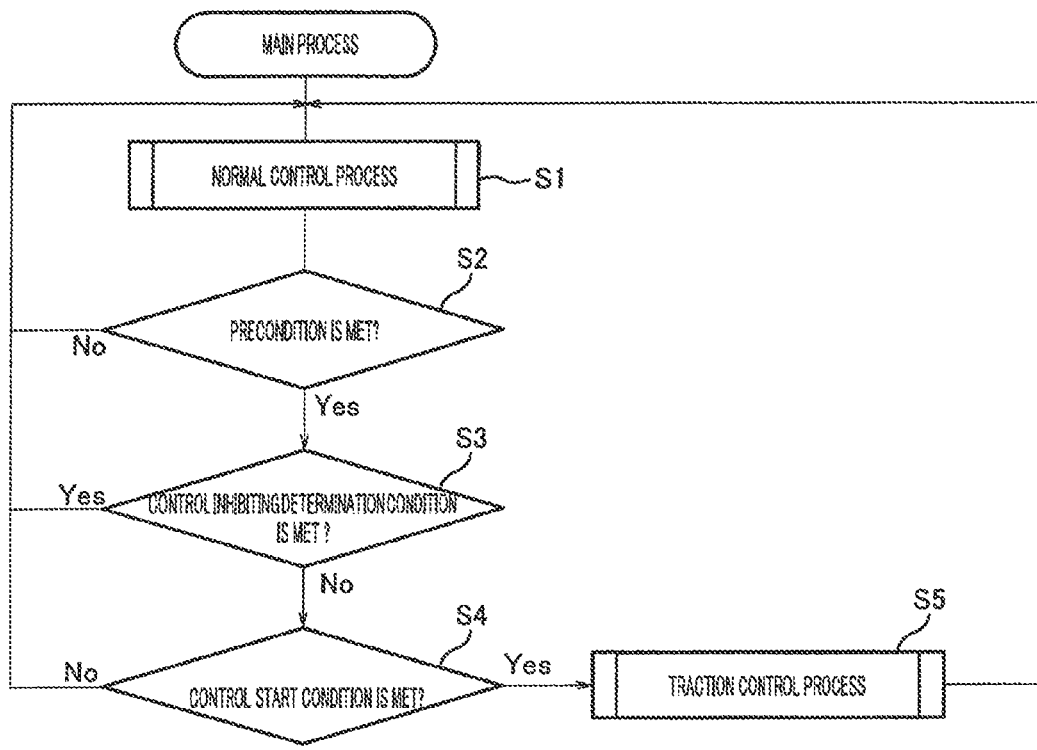
FIG. 4 is a flowchart showing a main process of Embodiment 1.

Referring now to FIG. 4, upon a main power supply (not shown) of the motorcycle 1 being ON, the engine ECU 17 executes normal control (step S1). Then, the condition determiner 46 in the engine ECU 17 determines whether or not the slip ratio (monitored value M) is greater than the control permission threshold (step S2). If it is determined that the slip ratio is less than the control permission threshold, the condition determiner 46 determines that it is not necessary to execute the traction control, and continues to determine whether or not the slip ratio is greater than the control permission value until the slip ratio becomes greater than the control permission threshold.

If it is determined that the slip ratio becomes greater than the control permission threshold, then the condition determiner 46 determines whether or not the monitored value M meets the control inhibiting determination condition to determine whether or not the monitored spin value M is beyond a scope of assumption, due to failure of the sensors 25, 29, 30, 32, 33, and other reasons (step S3). If it is determined that the monitored value M meets the control inhibiting determination condition, the traction control is inhibited and the normal control continues (step S1). On the other hand, if it is determined that the monitored value M does not meet the control inhibiting determination condition, the condition determiner 46 determines whether or not the monitored value M meets the control start condition to determine whether or not the rear wheel 3 is likely to spin to a great degree (step S4). If it is determined that the monitored value M does not meet the control start condition, the normal control continues (step S1). On the other hand, if it is determined that the monitored value M meets the control start condition, the engine ECU 17 performs a traction control process to initiate the traction control (step S5).

Figure 5:
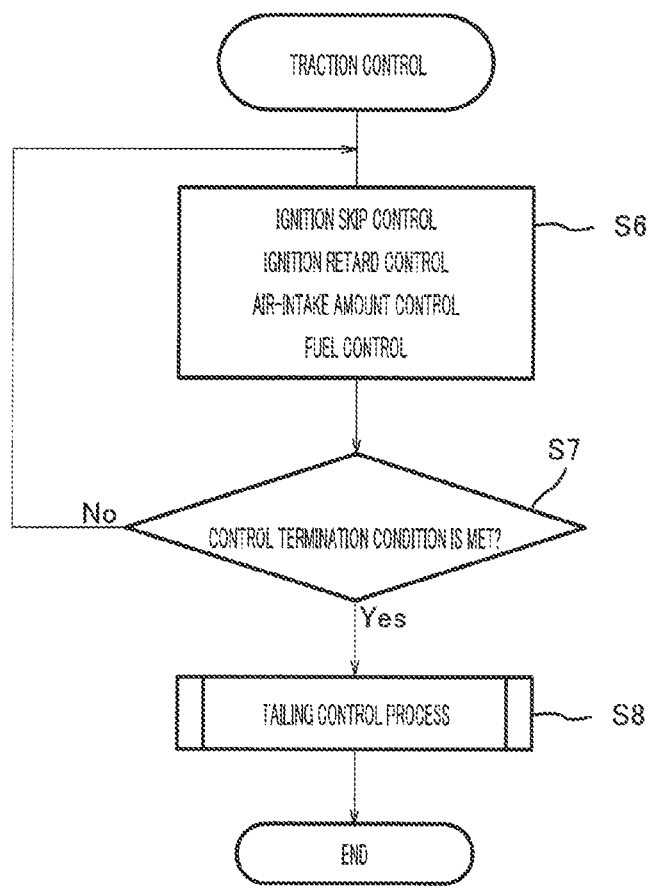
FIG. 5 is a flowchart showing a traction control process of Embodiment 1.

Referring to FIG. 5, upon the traction control being started, initially, the traction controller 47 performs ignition skip control and ignition retard control by commanding the ignition controller 42, performs air-intake amount control by commanding the throttle controller 43, and performs fuel control by commanding the fuel controller 48 (step S6).

In the ignition skip control, ignition (spark) in at least one of the four cylinders is not performed i.e., is paused, to reduce the engine driving power. In the ignition skip control, a cylinder in which ignition is paused is decided based on a predetermined ignition/combustion pattern. The ignition retard control is to retard the ignition timing by an amount corresponding to a predetermined retard angle amount, in a cylinder which performs ignition and combustion, thereby reducing the driving power. The ignition retard control and the ignition skip control are collectively referred to as ignition control. The air-intake amount control is to reduce the opening degree of the sub-throttle valve 22, thereby reducing the driving power. The fuel control is to reduce the amount of fuel injected from the injector 31 to a cylinder which performs ignition and combustion, thereby reducing the driving power. The air-intake amount control can reduce the engine driving power more than the ignition control. By performing the air-intake amount control, a reduction magnitude of the driving power can be increased during the traction control. Alternatively, in step S6, rear wheel brake control for controlling the operation of the rear wheel brake 38 may be performed to reduce the driving power.

During the above control for reducing the driving power transmitted to the rear wheel 3, the condition determiner 46 determines whether or not the monitored value M meets the control termination condition (step S7). If it is determined that the monitored value M does not meet the control termination condition, the ignition control and other control continues (step S6). On the other hand, if it is determined that the monitored value M meets the control termination condition, the traction control unit 41 performs tailing control process to execute tailing control (step S8).

The tailing control is to change the engine driving power so that it gets closer over time to the engine driving power to be generated in the normal control. When the engine driving power reaches the engine driving power to be generated in the normal control by the tailing control, the tailing control shifts to the normal control. By shifting the traction control to the normal control through the tailing control, a difference which could be generated between the engine driving power at the time point when the monitored value M meets the control termination condition, and the engine driving power to be generated in the normal control, can be lessened gradually, thereby making it possible to keep good driving feeling.

Figure 6:
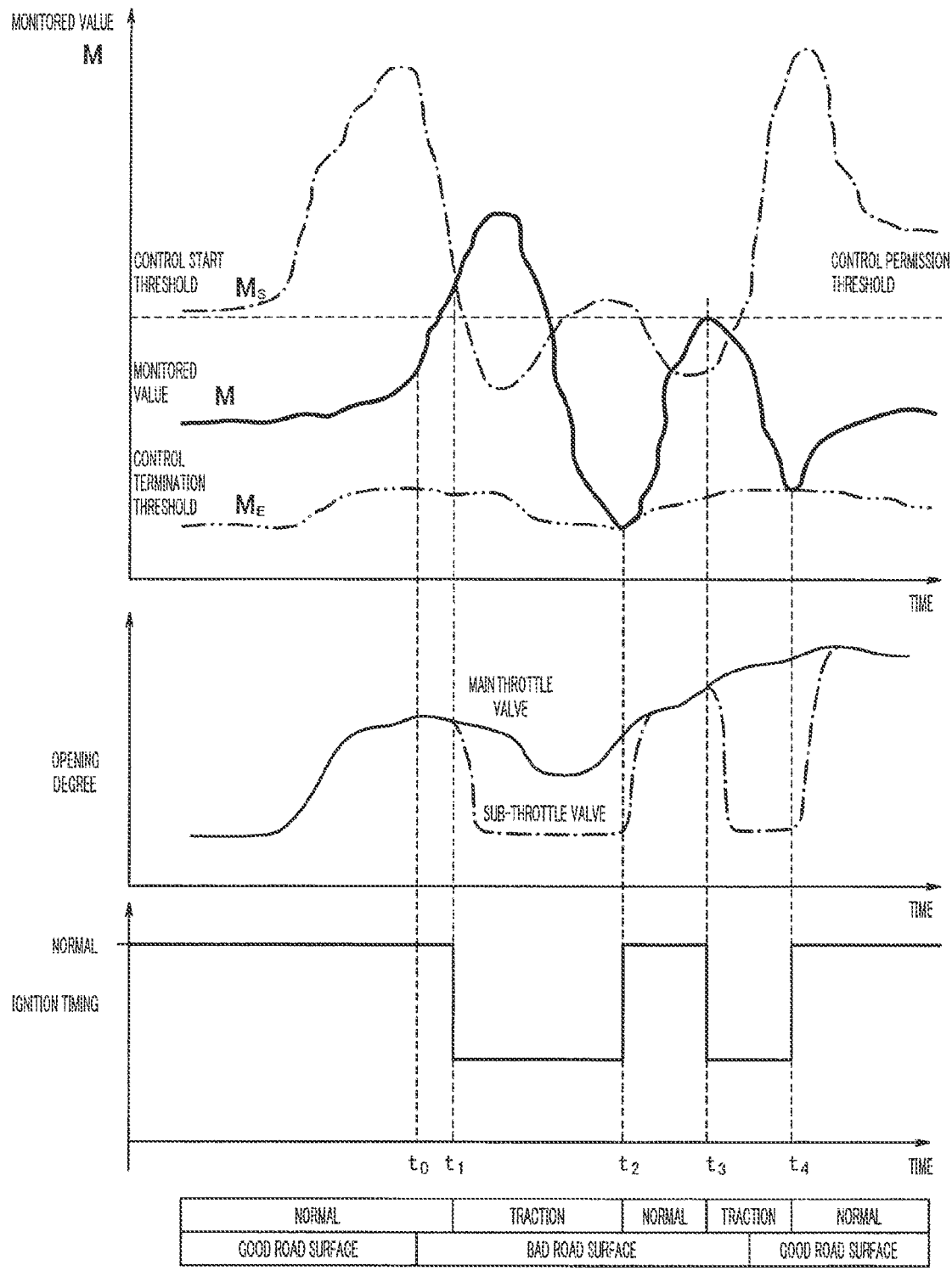
FIG. 6 is a timing chart showing an exemplary change in a vehicle state which occurs with time, when the control is executed along the flowcharts of FIGS. 4 and 5.

FIG. 6 is a timing chart showing an exemplary change in a vehicle state which occurs with time when the control is executed along the flowcharts of FIGS. 4 and 5. Referring to FIG. 6, when the motorcycle 1 is driving on a good road surface, it is probable that the monitored value M is less than the control permission threshold, as long as no failure occurs in the sensors and other components, and therefore, the normal control is performed. During the normal control, the opening degree of the main throttle valve 21 and the opening degree of the sub-throttle valve 22 are increasing. As described previously, the calculation formula of the control start threshold MS includes the sensitive factors, whereas the calculation formula of the control termination threshold ME does not. In other words, the control start condition is set to be affected more greatly by the sensitive factors than the control termination condition. If the vehicle state changes, the control start threshold MS changes more greatly according to the change in the vehicle state than the control termination threshold ME. At time t0, the motorcycle enters a road of a bad road surface condition. Because of this, after time t0, the monitored value M which changes according to the degree to which the drive wheel 3 slips rises steeply and exceeds the control permission threshold. In the present embodiment, the control termination threshold ME is set irrespective of the slip ratio or the change rate of the slip ratio. Therefore, the control termination threshold ME does not respond to the change in the monitored value M. In contrast, the control start threshold MS is set based on the factors such as the change rate of the slip ratio and the change rate of the engine speed, which are sensitive to a fluctuation in the degree of the slip, and set to decrease rapidly as the value of the change rate of the slip ratio and the value of the change rate of the engine speed increase. Therefore, the monitored value M and the control start threshold MS change close to each other. As a result, the monitored value M reaches a value which is greater than or equal to the control start threshold MS (see time t1). At this time point, the traction control is started. As described above, as soon as the motorcycle 1 enters the road of the bad road surface condition, the monitored value M rises and exceeds the control start threshold MS immediately, and the traction control is started promptly.

During the traction control, the opening degree of the sub-throttle valve 22 is reduced, or the ignition timing is retarded, to reduce the driving power of the rear wheel 3. Correspondingly, the monitored value M decreases. FIG. 6 shows a case where the monitored value M becomes less than the control start threshold MS when the monitored value M is decreasing. The traction control is not affected by the magnitude relationship between the monitored value M and the control start threshold MS. Therefore, the traction control continues even after the monitored value M becomes below the control start threshold MS. At a time point when the monitored value M becomes less than the control termination threshold ME, the traction control shifts to the normal control through the tailing control (see time t2).

After the traction control shifts to the normal control, the driving power transmitted to the rear wheel 3 is restored, and the monitored value M increases from the value less than the control termination threshold ME. If the motorcycle 1 has not exited the road of the bad road surface condition yet when the traction control has shifted to the normal control, then the monitored value M rises steeply and correspondingly the control start threshold MS decreases. If the motorcycle 1 is still driving on the bad road surface, the monitored value M probably rises rapidly up to a value which is greater than or equal to the control permission threshold and the control start threshold MS. In that case, the traction control is resumed (see time t3). On the other hand, if the motorcycle 1 exits the road of the bad road surface condition and enters a road of a good road surface condition in the middle of the traction control, the monitored value M does not rise up to a value greater than the control permission value in a state where the driving power is restored in the normal control which occurs after the traction control (see after time t4).

As described above, in the traction control system 18, the control start condition and the control termination condition are set such that the control start condition changes more sensitively to a change in the vehicle state than the control termination condition. In a case where the motorcycle 1 enters the road of the bad road surface condition, in a state where the traction control is not executed, the change in the vehicle state becomes great immediately thereafter. If the control start condition is insensitive to the change in the vehicle state, it cannot be detected correctly that the motorcycle 1 has entered the road of the bad road surface condition, and starting of the traction control might be delayed. Since the control start condition changes sensitively to the change in the vehicle state in the present embodiment, it can be determined properly whether or not to start the traction control adaptively to a situation where the traction control should be started. During the traction control, there is a tendency that the monitored value M changes less according to the degree of the slip, with a reduction in the driving power. If the control termination condition is sensitive to the change in the vehicle state, the traction control might be terminated undesirably even though the motorcycle 1 is driving on the bad road surface and the traction control is started and terminated repeatedly thereafter. By using the control termination condition set as described above, it can be determined properly whether or not to terminate the traction control, adaptively to a situation where the traction control should be terminated.

Since the control termination threshold ME is set to change to have relatively smaller values, the traction control is not terminated as long as the degree to which the rear wheel 3 slips is not lessened and the monitored value M compared to the control termination threshold ME is not a smaller value. Since the traction control continues until the degree to which the rear wheel 3 slips is significantly lessened, a stable driving feeling can be ensured even when the driving power is restored thereafter at a high pace. That is, if the motorcycle 1 has not exited the road of the bad road surface condition yet at the time point when the traction control is terminated, the traction control is resumed promptly to reduce the driving power, and this control continues until the motorcycle 1 has exited the road of the bad road surface condition, while if the motorcycle 1 has exited the road of the bad road surface condition, it can drive normally in a state where the rear wheel 3 is gripping the road surface. Since the control termination threshold ME is insensitive to the change in the vehicle state and is set to a smaller value, it is possible to avoid a situation where the traction control is terminated promptly after the motorcycle 1 has just entered the road of the bad road surface condition and a situation where the driving power must be restored gradually even after the motorcycle 1 has exited the road of the bad road surface condition.

The variable parameters (slip determination factors) in the formula 2 for setting the control start threshold MS are weighted by weighting coefficients. The weighting coefficients are set smaller in the engine E in which a change rate of the engine speed is great, while the weighting coefficients are set smaller in the motorcycle 1 in which an allowable slip ratio is small. With this setting, the control start condition can be adjusted according to vehicle characteristics or the like.

By changing the weighting coefficients according to the driving state, the conditions with which the traction control is executed can be adjusted according to the driving state of the motorcycle 1. For example, in a case where the motorcycle 1 is probably driving on a slippery road surface in a state where the change rate of the opening degree of the main throttle valve 21 is small but the slip ratio is high, the weighting coefficients are set to smaller values so that the traction control is started promptly even though the monitored value M is small. On the other hand, in a case where the motorcycle 1 is probably driving on a non-slippery road surface in a state where the change rate of the opening degree of the main throttle valve 21 is great but the slip ratio is low, the weighting coefficients are set to greater values to inhibit the traction control from being started even though the monitored value M is great. In this way, the control start condition can be set according to the driving state.

In the traction control system 18, the weighting coefficients are added to the values of the factors without modifying them. The weighting coefficients may be set to greater values when the vehicle is in a predetermined driving state, for example, the motorcycle 1 is driving at a high speed and the change rates in the vehicle states are small. This makes it possible to prevent the control start threshold MS from decreasing in excess and the traction control from being started undesirably. For example, in a case where the driver applies a great driving power to the drive wheel 3 to cause the rear wheel 3 to slip intentionally, the weighting coefficients may be set to greater values to prevent the control start threshold MS from decreasing in excess and the traction control from being started undesirably. Similar advantages are achieved if a predetermined value is changed according to a predetermined driving state of the motorcycle 1, instead of the weighting coefficients.

Figure 7:
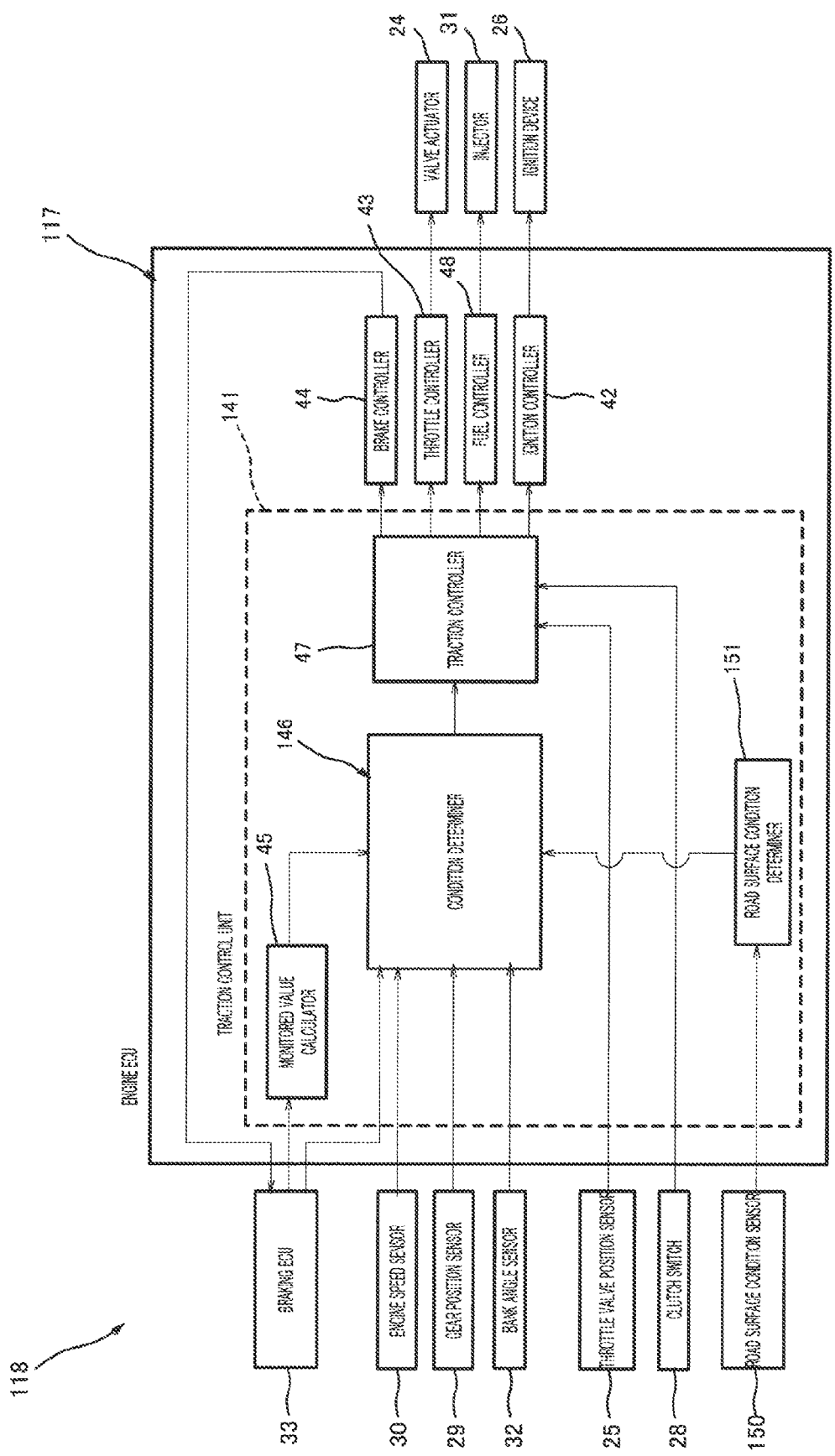
FIG. 7 is a block diagram showing major components in a traction control system according to Embodiment 2 of the present invention.

FIG. 7 is a block diagram showing major components in a traction control system 118 according to Embodiment 2 of the present invention. Hereinafter, the same components as those in Embodiment 1 are designated by the same reference symbols and will not be described repetitively. In Embodiment 2, the traction control system 118 includes a road surface condition sensor 150 for detecting a road surface condition and providing the detected road surface condition as an input to an engine ECU 117. In the engine ECU 117, a traction control unit 141 includes a road surface condition determiner 151 for determining the road surface condition.

The road surface condition sensor 150 may be attached on the frame of the motorcycle 1 and configured to emit light onto the road surface and detect the road surface condition according to a distribution of spectra of the reflected light from the road surface. The sensor for detecting the road surface condition may be replaced by another input device so long as the road surface condition determiner in the ECU 117 can determine the road surface condition based on information received from the input device. For example, the road surface condition sensor 150 may be replaced by an operation member with which the driver operates to input the road surface condition. In a further alternative, in a case where the above special sensor or the operation member is omitted, the road surface condition can be estimated based on the change rate of the engine speed or the change rate of the opening degree of the throttle valve.

The road surface condition determiner 151 determines whether the road surface condition is a first road surface condition or a second road surface condition of the low-pt-road in which the rear wheel 3 is more likely to slip than in the first road surface condition, based on the information received from the road surface condition sensor 150, a change rate of the engine speed calculated based on the information received from the engine speed sensor 30, or a change rate of the throttle valve opening degree calculated based on the information received from the throttle valve position sensor 25.

The condition determiner 146 sets the control start condition or the control termination condition according to the road surface condition based on a result of the determination made by the road surface condition determiner 151. The condition determiner 146 sets a first control start condition as the control start condition and a first control termination condition as the control termination condition when the road surface condition determiner 151 determines that the road surface condition is the first road surface condition. In addition, the condition determiner 146 sets a second control start condition as the control start condition and a second control termination condition as the control termination condition when the road surface condition determiner 151 determines that the road surface condition is the second road surface condition.

The first control start condition is specifically expressed as the following formula (5) and defines a first control start threshold MS1 compared to the monitored value M. The second control start condition is specifically expressed as the following formula (6) and defines a second control start threshold MS2 compared to the monitored value M. The first control termination condition is specifically expressed as the following formula (7) and defines a first control termination threshold ME1 compared to the monitored value M. The second control termination condition is specifically expressed as the following formula (8) and defines a second control termination threshold ME2 compared to the monitored value M. The calculation formulas used to calculate the thresholds are similar to those in the above formulas (3)~(5), and will not be described repetitively.

$$\text{Monitored value } M \geq \text{first control start threshold } MS1 \quad (5)$$

$$\text{Monitored value } M \geq \text{second control start threshold } MS2 \quad (6)$$

$$\text{Monitored value } M < \text{first control termination threshold } ME1 \quad (7)$$

$$\text{Monitored value } M < \text{second control termination threshold } ME2 \quad (8)$$

Figure 8:
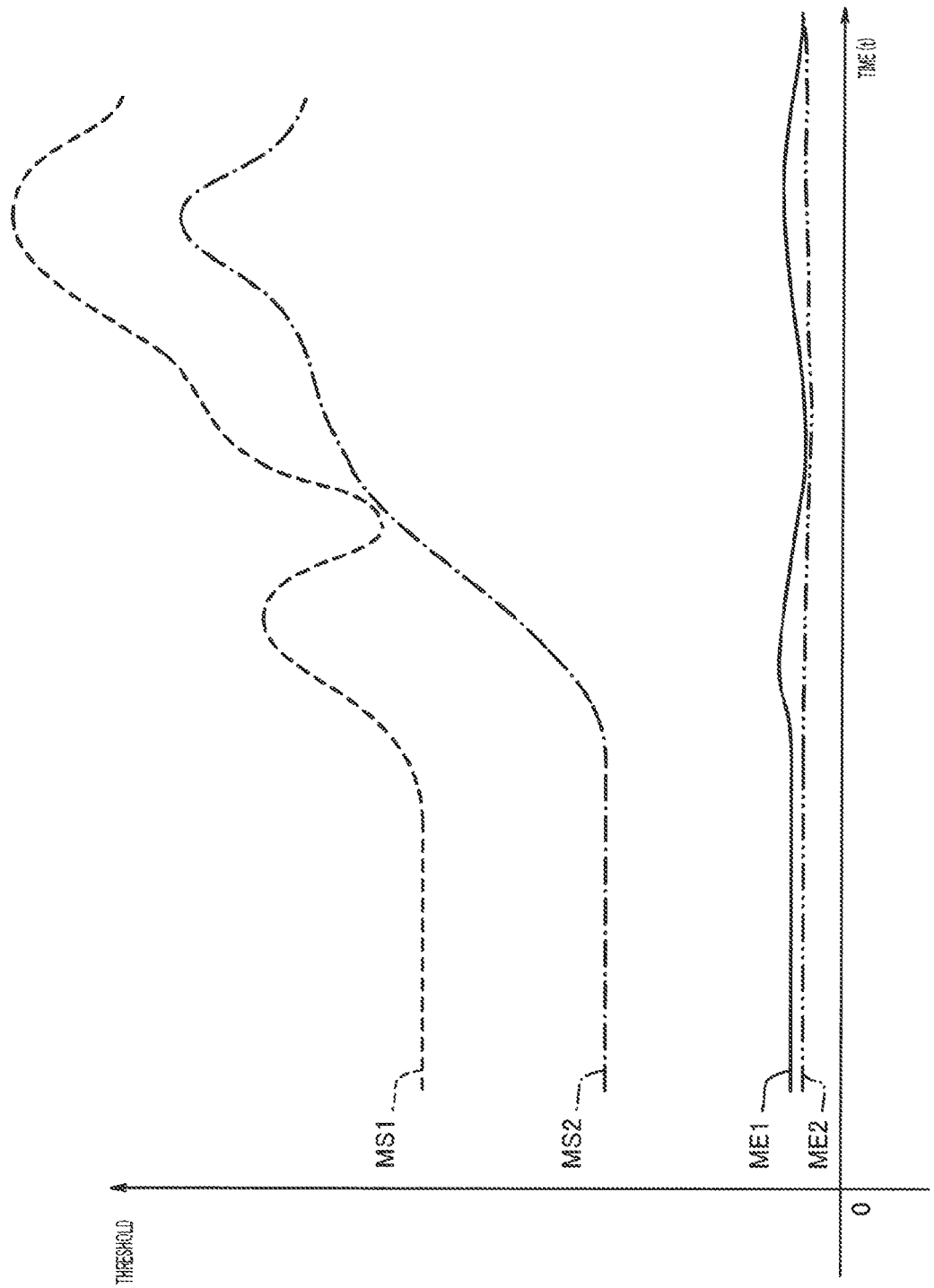
FIG. 8 is a graph showing exemplary changes in a first control start threshold, a second control start threshold, a first control termination threshold and a second control termination threshold, which occur with time, according to Embodiment 2 of the present invention.

FIG. 8 is a graph showing exemplary changes in the first control start threshold MS1, the second control start threshold MS2, the first control termination threshold ME1 and the second control termination threshold ME2, which occur with time, according to Embodiment 2 of the present invention. As shown in FIG. 8, the second control start threshold MS2 set for the road surface condition in which the rear wheel 3 is more likely to slip is set smaller than the first control start threshold MS1 in the same vehicle state and set to change sensitively to a change in the vehicle state. The second control termination threshold ME2 set for the road surface condition in which the rear wheel 3 is more likely to slip is set smaller than the first control termination threshold ME1 in the same vehicle state and set to change insensitively to a change in the vehicle state.

When the motorcycle 1 is driving on the slippery road surface, the vehicle state changes more greatly than when the motorcycle 1 is driving on the road surface which is not slippery. Therefore, by setting the control start condition and the control termination condition as described above, the traction control is started promptly and the traction control started once can be continued for a long period of time, when the motorcycle 1 is driving on the slippery road surface on which the rear wheel 3 slips easily. Thus, in accordance with the present embodiment, it can be determined properly whether or not to start the traction control and whether or not to terminate the traction control according to the road surface condition.

Figure 9:
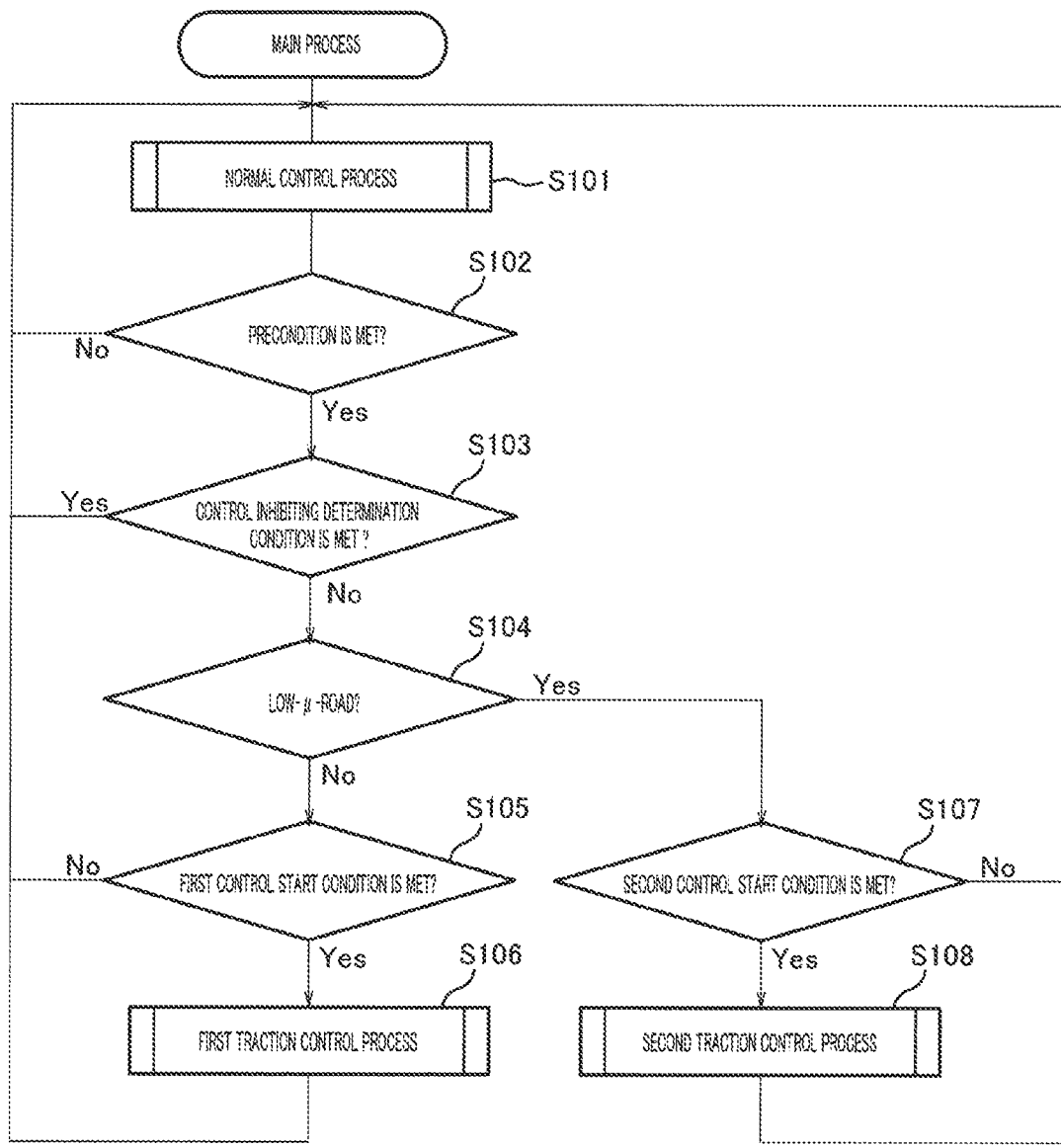
FIG. 9 is a flowchart showing a main process of Embodiment 2 which is executed by an engine ECU.

FIG. 9 is a flowchart showing a main process of Embodiment 2 which is executed by the engine ECU 117. Referring now to FIG. 9, like Embodiment 1, upon a main power supply (not shown) of the motorcycle 1 being ON, the engine ECU 117 executes normal control (step S101). Then, a condition determiner 146 in the engine ECU 117 determines whether or not the slip ratio (monitored value M) is greater than the control permission threshold (step S102). If it is determined that the slip ratio is less than the control permission threshold, the condition determiner 146 continues to determine whether or not the slip ratio is greater than the control permission threshold value until the slip ratio becomes greater than the control permission threshold. If it is determined that the slip ratio becomes greater than the control permission threshold, the condition determiner 146 determines whether or not the monitored value M meets the control inhibiting determination condition (step S103). If it is determined that the monitored value M meets the control inhibiting determination condition, the normal control continues (step S101).

On the other hand, if it is determined that the monitored value M does not meet the control inhibiting determination condition, the road surface condition determiner 151 determines whether the road surface condition is the first road surface condition or the second road surface condition of the low-μ-road as compared to the road of the first road surface condition (step S104). If it is determined that the road surface condition is the first road surface condition, the condition determiner 146 determines that the control start condition is the first control start condition and the control termination condition is the first control termination condition, and determines whether or not the monitored value M meets the first control start condition (step S105). If it is determined that the monitored value M does not meet the first control start condition, the normal control is continued (step S101). On the other hand, if it is determined that the monitored value meets the first control start condition, the first traction control process is started (step S106). In contrast, if it is determined that the road surface condition is the second road surface condition, the condition determiner 146 determines that the control start condition is the second control start condition and the control termination condition is the second control termination condition, and determines whether or not the monitored value M meets the second control start condition (step S107). If it is determined that the monitored value does not meet the second control start condition, the normal control is continued (step S101). On the other hand, if it is determined that the monitored value M meets the second control start condition, the second traction control process is started (step S108).

Figure 10:
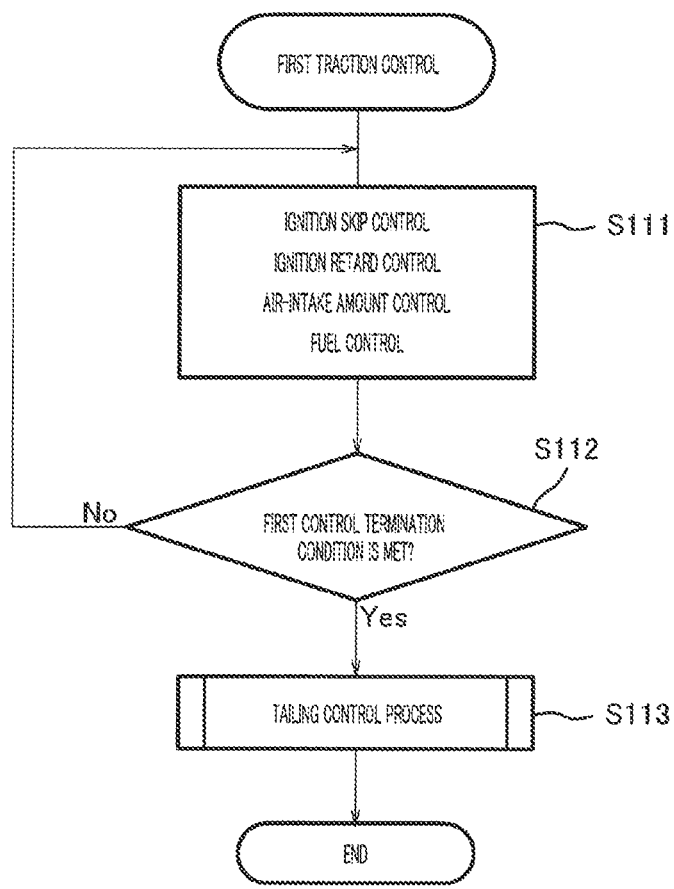
FIG. 10 is a flowchart showing a first traction control process of Embodiment 2 which is executed by the engine ECU.

Referring to FIG. 10, in the first traction control, the ignition skip control, the ignition retard control, the air-intake amount control and the fuel control are carried out (step S111). Then, the condition determiner 146 determines whether or not the monitored value M meets the first control termination condition (step S112). If it is determined that the monitored value M does not meet the first control termination condition, a traction control unit 141 continues the ignition skip control, and other control (step S111), whereas if it is determined that the monitored value M meets the first control termination condition, then the traction control unit 141 performs a tailing control process to execute the tailing control (step S113), and thereafter, the tailing control shifts to the normal control (step 101).

Figure 11:
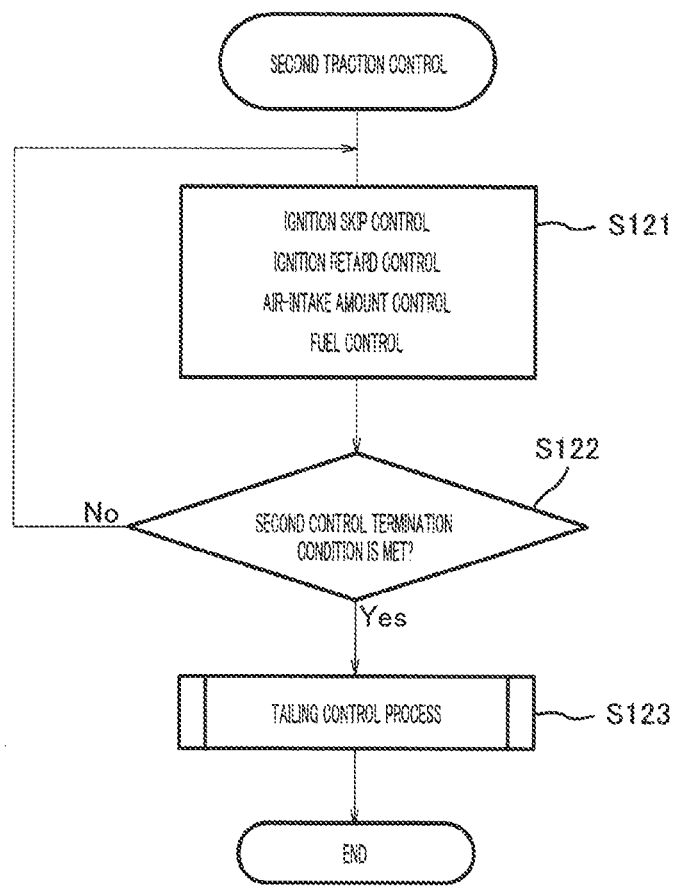
FIG. 11 is a flowchart showing a second traction control process according to Embodiment 2.

As shown in FIG. 11, in the second traction control, the ignition skip control, the ignition retard control, the air-intake amount control and the fuel control are carried out (step S121), as in the case of the first traction control. Then, the condition determiner 146 determines whether or not the monitored value M meets the second control termination condition (step S122). If it is determined that the monitored value M does not meet the second control termination condition, the traction control unit 141 continues the ignition skip control, and other control (step S121), while if it is determined that the monitored value M meets the second control termination condition, then the traction control unit 141 performs the tailing control process to execute the tailing control (step S123), and thereafter, the tailing control shifts to the normal control (step 101).

Through the above described process steps, it is possible to determine properly whether or not to start the traction control and whether or not to terminate the traction control according to the road surface condition, as described above.

Figure 12:
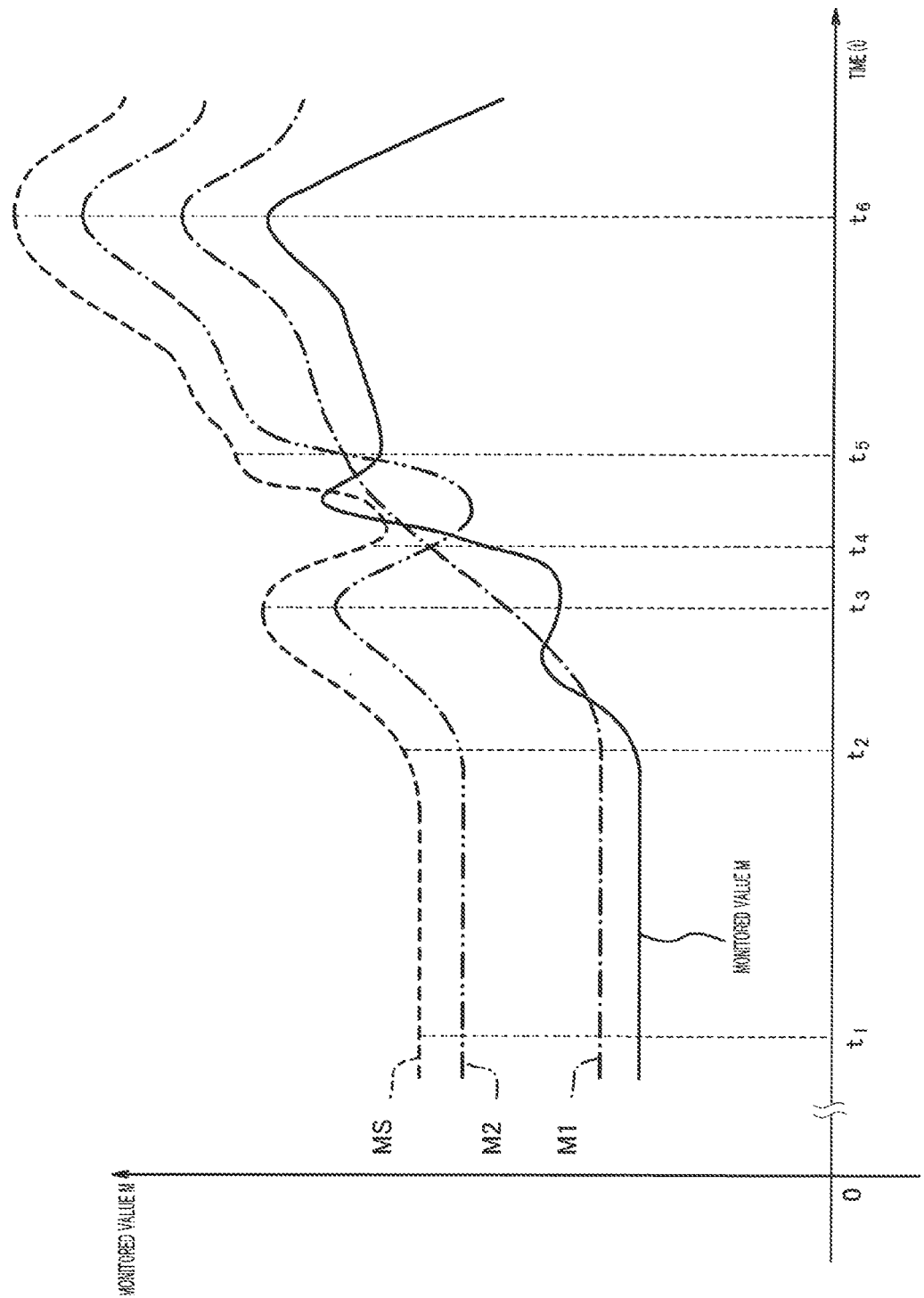
FIG. 12 is a graph showing exemplary changes in first to third driving power suppressing conditions which occur with time, according to Embodiment 3 of the present invention.

FIG. 12 is a graph showing exemplary changes in first to third driving power suppressing conditions which occur with time, according to Embodiment 3 of the present invention. Since the same or corresponding components are used in the traction control system of Embodiment 3, description will be given using the reference symbols assigned to the components in Embodiment 1 with reference to FIGS. 1 to 3. In Embodiment 3, the condition determiner 46 determines whether or not the monitored value M meets the three driving power suppressing conditions, and the traction controller 47 is configured to perform the traction control according to a result of the determination performed by the condition determiner 46.

In FIG. 12, a vertical axis indicates the monitored value M, the first variable threshold M1, the second variable threshold M2 and the control start threshold MS, and a horizontal axis indicates a time. The control start threshold MS corresponds to the control start threshold MS of Embodiment 1. In the present embodiment, it is determined that the monitored value M meets the third driving power suppressing condition if the monitored value M is greater than or equal to the control start threshold MS.

It is determined that the monitored value M meets the first driving power suppressing condition if the monitored value M is greater than or equal to the first variable threshold M1. It is determined that the monitored value M meets the second driving power suppressing condition if the monitored value M is greater than or equal to the second variable threshold M2. If it is determined that the monitored value M meets any one of the first to third driving power suppressing conditions, then the condition determiner 46 determines that the rear wheel 3 is about to spin undesirably with respect to the road surface and the driving power should be reduced. The first driving power suppressing condition is specifically expressed as the following formula 5. The second driving power suppressing condition is specifically expressed as the following formula 6.

$$\text{Monitored value } M \geq \text{first variable threshold } M1 \quad (5)$$
$$= K1Th \times Th + K1dTh \times \Delta Th + K1dNe \times \Delta NE + K1dSL \times \Delta SL + K1Acc \times Acc + \alpha$$

$$\text{Monitored value } M \geq \text{second variable threshold } M2 \quad (6)$$
$$= K2Th \times Th + K2dTh \times \Delta Th + K2dNe \times \Delta NE + K2dSL \times \Delta SL + K2Acc \times Acc + \beta$$

K1Th, K1dTh, K1dNe, K1dSL, K1Acc, K2dTh, K2Th, K2dNe, K2dSL and K2Acc are weighting coefficients with respect to Th, $\Delta$Th, $\Delta$NE, $\Delta$SL and Acc, and $\alpha$ and $\beta$ are predetermined constants. Each of the first driving power suppressing condition and the second driving power suppressing condition includes the sensitive factors among the slip determination factors, and responds sensitively to a change in the vehicle state.

As described above, the first driving power suppressing condition is such that the monitored value M is greater than or equal to the first variable threshold M1 and the second driving power suppressing condition is such that the monitored value M is greater than or equal to the second variable threshold M2. The first variable threshold M1 and the second variable threshold M2 are set variably and their magnitude relationship changes according to the respective weighting coefficients.

Referring to FIG. 12, in a steady state, the first variable threshold M1 is smaller than the second variable threshold M2 (time t1~t2 in FIG. 12), and the weighting coefficients are set so that the first variable threshold M1 and the second variable threshold M2 increase as Th changes rapidly and the change rate of $\Delta$Th increases, for example, when the driver rotates the throttle grip 7 rapidly (e.g., time t3 in FIG. 12). However, for example, when the engine speed increases rapidly and thereby the change rate of the engine speed (or change rate of the slip ratio) increases (e.g., time t4 in FIG. 12), the second variable threshold M2 becomes smaller than the first variable threshold M1 in some occasions. Thereafter, when the change rate of the engine speed (or change rate of the slip ratio) decreases, the first variable threshold M1 becomes smaller than the second variable threshold M2 (after time t5 in FIG. 12). Thus, the first driving power suppressing condition and the second driving power suppressing condition have formulas different from each other and are independently set so as not to interfere with each other. Therefore, the magnitude relationship between the first variable threshold M1 and the second variable threshold M2 is not constant, and the magnitude relationship between the two suppressing conditions may be reversed depending on the situation. In the present embodiment, if the monitored value M meets both of the first and second driving power suppressing conditions, a higher priority is given to the fact that the monitored value M meets the second driving power suppressing condition. In the present embodiment, the first variable threshold M1 and the second variable threshold M2 are set not to exceed the control start threshold MS.

Figure 13:
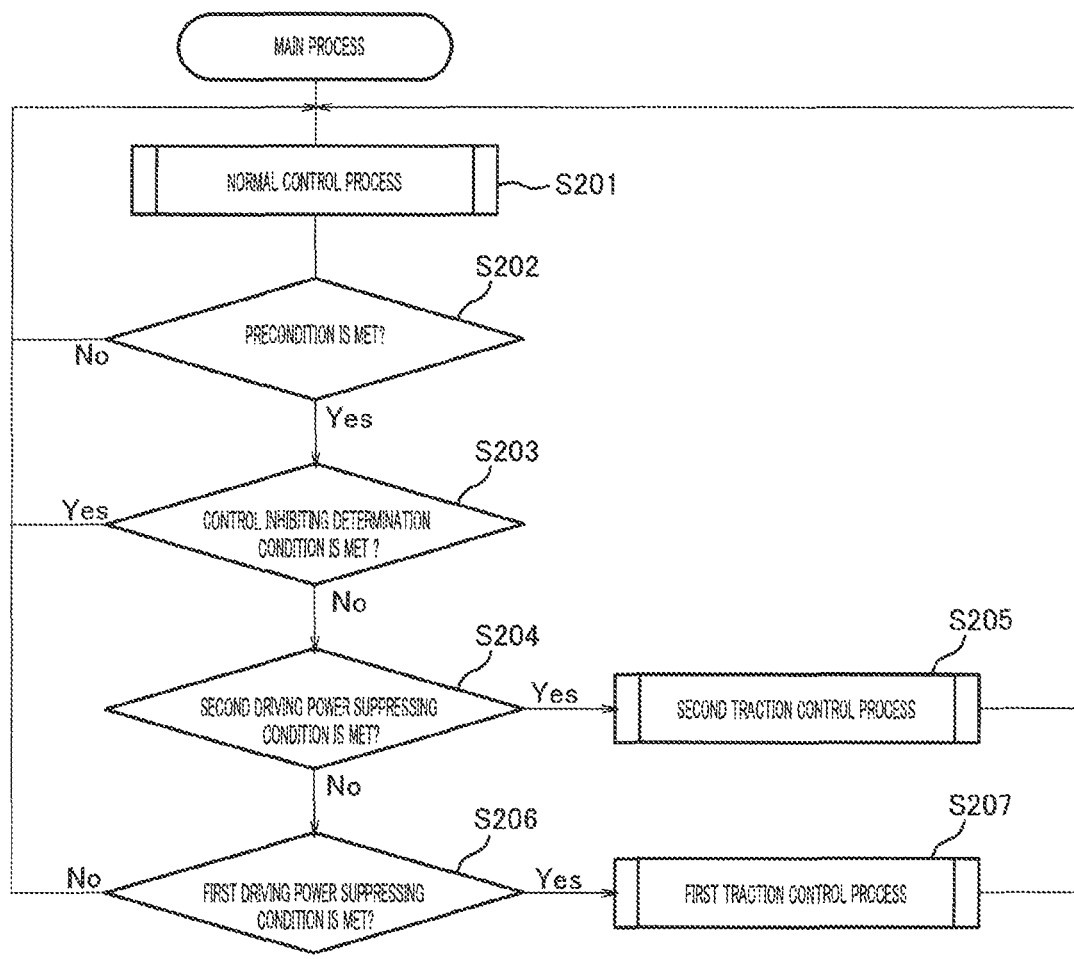
FIG. 13 is a flowchart showing a main process in Embodiment 3.

FIG. 13 is a flowchart showing a main process of Embodiment 2. Referring now to FIG. 13, in the present embodiment, upon an ignition switch being ON, the engine ECU 17 executes normal control (step S201). The condition determiner 46 in the engine ECU 17 determines whether or not the monitored value M (slip ratio) is less than the control permission threshold (step S202). If it is determined that the slip ratio is less than the control permission threshold, the condition determiner 46 determines that it is not necessary to execute the traction control, and continues to determine whether or not the slip ratio is less than the control permission threshold until the slip ratio becomes greater than the control permission threshold.

If it is determined that the slip ratio becomes greater than the control permission threshold, the condition determiner 46 then determines whether or not the monitored value M meets the control inhibiting determination condition to determine whether or not the monitored value M is beyond a scope of assumption, due to failure of the sensors 25, 29, 30, 32, and 33, or another reason (step S203). If it is determined that the monitored value M meets the control inhibiting determination condition, the traction control is inhibited and the normal control continues (step S201). On the other hand, if it is determined that the monitored value M does not meet the control inhibiting determination condition, the condition determiner 46 then determines whether or not the monitored value M meets the second driving power suppressing condition to determine whether or not the rear wheel 3 is likely to spin to a great degree (step S204). If it is determined that the monitored value M meets the second driving power suppressing condition, the engine ECU 17 performs the second traction control process to initiate the second traction control (step S205). The second traction control will be described later.

If it is determined that the monitored value M does not meet the second driving power suppressing condition, then the condition determiner 46 determines whether or not the monitored value M meets the first driving power suppressing condition to determine whether or not the rear wheel 3 is likely to spin (step S206). If it is determined that the monitored value M meets the first driving power suppressing condition, the engine ECU 17 performs the first traction control process to initiate the first traction control (step S207). If it is determined that the monitored value M does not meet the first driving power suppressing condition, then the engine ECU 17 determines that it is not necessary to perform the traction control and continues the normal control (step S201).

Figure 14:
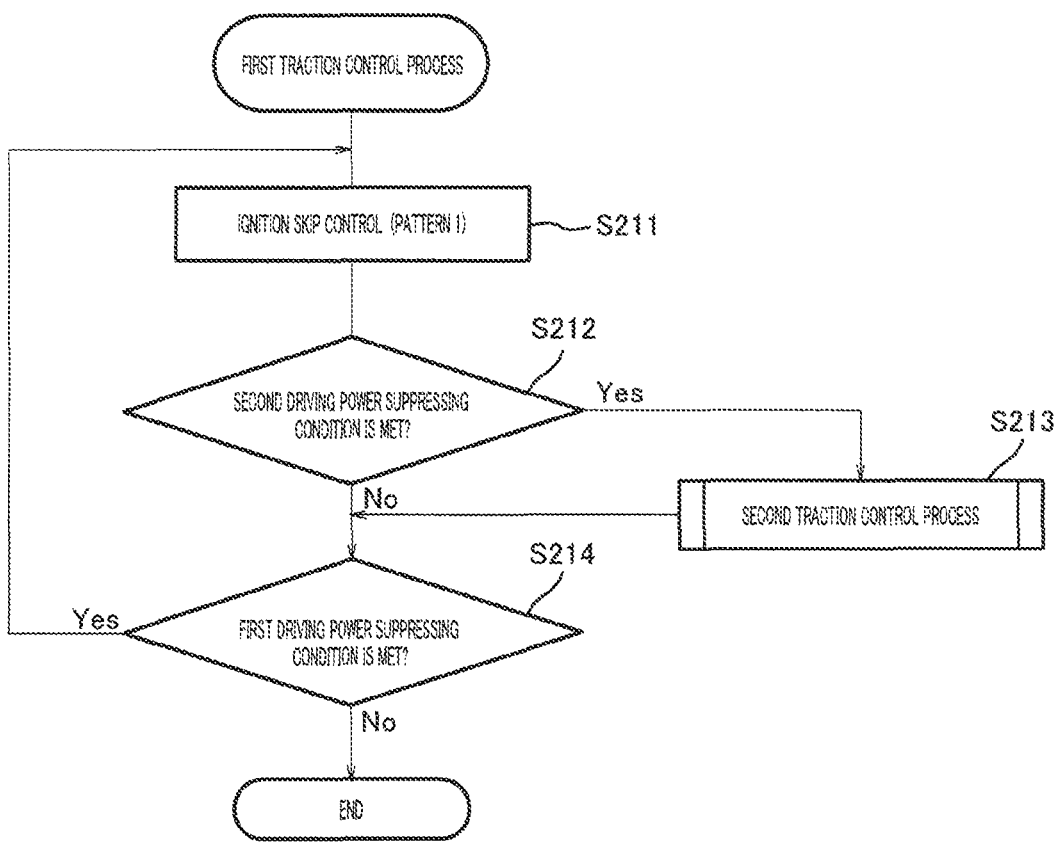
FIG. 14 is a flowchart showing a first traction control process in Embodiment 3.
Figure 15:
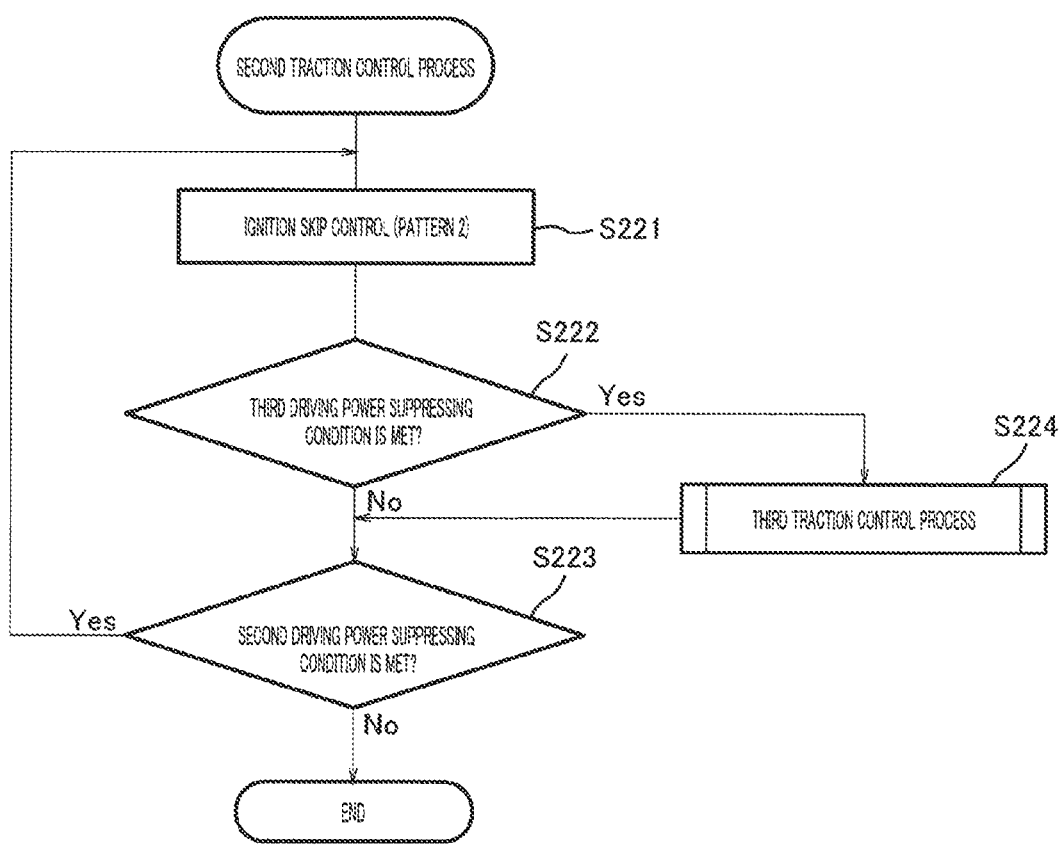
FIG. 15 is a flowchart showing a second traction control process in Embodiment 2.

The first traction control is similar in content to the second traction control. As shown in FIGS. 14 and 15, the ignition skip control is carried out in both of the first traction control and the second traction control (step S211, step S221). In the ignition skip control, a cylinder in which ignition is paused is decided based on, for example, pattern 1 shown in FIG. 16.

In the pattern 1 shown in FIG. 16, first, second, third, fourth and fifth represent the order of ignition in the cylinders after start of the ignition skip control, symbol ○ indicates execution of ignition in the corresponding cylinder, and symbol X indicates that ignition is paused in the corresponding cylinder. According to the driving power to be reduced, the number of cylinders in which ignition is paused is different. In the first traction control, the ignition skip control is performed according to the pattern 1.

The ignition skip control based on the pattern 1 will be described in more detail. After start of the ignition skip control, ignition is paused in a cylinder which is scheduled to perform ignition in 1st order, but ignition occurs successively in cylinders scheduled to perform ignition in 2nd, 3rd, 4th and 5th orders. When ignition in the cylinder scheduled to perform ignition in 5th order is complete, the pattern 1 is repeated, so that ignition is paused in the cylinder scheduled to perform ignition in sixth order. In summary, ignition is paused in cylinders scheduled to perform ignition in 1st, 6th, 11th, 16th, . . . (5n+1)-th orders. When the ignition skip control is executed according to the pattern 1, the cylinder in which ignition is paused is shifted one by one, and thus, ignition is not paused in the same cylinder continuously. In the pattern 2, ignition is paused in cylinders scheduled to perform ignition in 1st order and in 2nd order. In summary, ignition is paused in cylinders scheduled to perform ignition in 1st, 2nd, 6th, 7th, 11th, 12-th, . . . (5n+1)-th, (5n+2)-th orders.

During the ignition skip control, the condition determiner 46 determines whether or not the monitored value M meets the second driving power suppressing condition (step S212). If it is determined that the monitored value M meets the second driving power suppressing condition, the traction control unit 41 performs the second traction control (step S213) as described later. If it is determined that the monitored value M does not meet the second driving power suppressing condition, and the second traction control process terminates in step S213, the condition determiner 46 determines whether or not the monitored value M meets the first driving power suppressing condition (step S214). If it is determined that the monitored value M meets the first driving power suppressing condition, then the ECU 17 continues the ignition skip control (step S211). If it is determined that the monitored value M does not meet the first driving power suppressing condition, the traction control unit 41 terminates the first traction control process and returns to the normal control (step S201).

In the second traction control, as in the first traction control, the traction controller 47 causes the ignition controller 42 to command the ignition device 26 to perform the ignition skip control (step S221). In the second traction control, the ignition skip control is carried out based on the pattern 2 (see pattern 2 in FIG. 16) in which the number of cylinders in which ignition is paused is greater than that in the pattern 1. By changing the number of cylinders in which ignition is paused, a reduction amount of the driving power is increased to quickly reduce a spin amount of the drive wheel 3. During the ignition skip control, the condition determiner 46 determines whether or not the monitored value M meets the third driving power suppressing condition (step S222). If it is determined that the monitored value M does not meet the third driving power suppressing condition, then the condition determiner 46 determines whether or not the monitored value M meets the second driving power suppressing condition (step S223). If it is determined that the monitored value M meets the second driving power suppressing condition, the traction control unit 41 continues the ignition skip control (step S221), while if it is determined that the monitored value M does not meet the second driving power suppressing condition, the traction control unit 41 terminates the second traction control process and the process returns to step S214.

If it is determined that the monitored value M meets the third driving power suppressing condition in step S222, the traction control unit 41 performs the third traction control process to execute the third traction control (step S224). The third traction control process corresponds to the traction control process (see FIG. 5) of Embodiment 1. To be specific, the ignition retard control, the air-intake amount control and the fuel control are carried out in addition to the ignition skip control. The traction control continues as long as the monitored value M is greater than or equal to the control termination threshold ME.

In the present embodiment, in a state prior to the third traction control corresponding to the traction control of Embodiment 1, the first traction control and the second traction control are carried out preliminarily. Because of this, when the motorcycle 1 is driving on, for example, a road surface such as a wet asphalt road surface, which is not regarded as a good road surface (e.g., asphalt road surface on a shiny day), but is not regarded as a very bad road surface (e.g., an icy road surface) on which the motorcycle 1 is most likely to slip, a magnitude of a reduction amount of the driving power can be lessened while reducing the driving power. This allows the drive wheel to be prevented properly from spinning out.

Although the present invention is applied to the motorcycle 1 including the engine E, it may be applied to the motorcycle 1 in which the drive wheel is driven by the motor. In this case, in the first and second driving power suppressing conditions, a motor rotational speed is used instead of the engine speed Ne.

Although in the present embodiment, the opening degree of the sub-throttle valve 22 is controlled during the air-intake amount control, the valve actuator 24 may be provided for the main throttle valve 21 to control the opening degree of the main throttle valve 21, thereby controlling its flow rate. In that case, the sub-throttle valve 22 may be omitted.

In a case where the clutch switch 28 detects that the clutch 27 is disengaged, a misfire could occur and an engine stall occurs under the state the driving power is kept suppressed. To avoid this, as soon as it is detected that the clutch is disengaged in the middle of the traction control, the traction control may be shifted to the normal control.

A stroke sensor may be attached on a rear damper (not shown) in the motorcycle 1 to detect a stroke amount of the rear damper, and the driving power suppressing condition may be set according to the stroke amount. For example, when the stroke amount is great, a load applied to the rear wheel 3 is great and the rear wheel 3 is less likely to spin, and therefore, the control start threshold MS, and the first and second variable thresholds M1 and M2 are set to smaller values. On the other hand, when the stroke amount is small, a load applied to the rear wheel 3 is small and the rear wheel 3 is more likely to spin, and therefore, the control start threshold MS, and the first and second variable thresholds M1 and M2 are set to greater values. Thus, the control start threshold MS, and the first and second variable thresholds M1 and M2 are set according to a change in a load distribution of the motorcycle 1, to prevent the traction control from being started undesirably.

Although in the above embodiments, the traction control system is incorporated into the motorcycle including the engine, it may be applied suitably to an electric motorcycle driven by an electric motor. In this case, an accelerator operation amount or an acceleration command value may be used as the instantaneous value of the vehicle state, instead of the throttle valve opening degree which is the acceleration command value. Alternatively, the rotational speed of the output shaft of the motor may be used as the instantaneous value of the vehicle state instead of the engine speed.

In accordance with the present invention, the traction control system is capable of determining properly whether or not to start the traction control and whether or not to terminate the traction control and is widely used to be incorporated into vehicles such as the motorcycle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A traction control system in a vehicle comprising:
   a detector for detecting a monitored value which changes according to a degree to which a drive wheel slips;
   a condition determiner for determining whether or not the monitored value detected by the detector meets a control start condition of traction control and whether or not the monitored value detected by the detector meets a control termination condition of the traction control; and
   a controller for executing the traction control to reduce a driving power of the drive wheel during a period of time from when the condition determiner determines that the monitored value meets the control start condition until the condition determiner determines that the monitored value meets the control termination condition;
   wherein the control start condition is a condition in which the monitored value is greater than or equal to a control start threshold, the control termination condition is a condition in which the monitored value is less than a control termination threshold, and the control start threshold and the control termination threshold are independently set;
   the condition determiner being configured to set at least the control start threshold variably based on a slip determination factor which changes according to a vehicle state and set the control start threshold and the control termination threshold such that the control start threshold changes more greatly according to the vehicle state than the control termination threshold; and
   the slip determination factor includes a temporal difference value of a driving state of the vehicle or a temporal difference value of a slip ratio.

2. The traction control system in the vehicle according to claim 1,
   wherein the slip determination factor includes a sensitive factor indicating a difference between an instantaneous value and a past value of the vehicle state and an insensitive factor indicating an instantaneous value or a delay calculation value using an instantaneous value and a past value of the vehicle state; and the control start threshold is set variably according to the sensitive factor and the control termination threshold is set variably according to the insensitive factor or to a constant value irrespective of a change in the vehicle state.

3. The fraction control system in the vehicle according to claim 1,
wherein the controller starts the traction control when the monitored value is greater than or equal to a control permission threshold at which execution of the traction control is permitted and meets the control start condition.

4. The traction control system in the vehicle according to claim 1, further comprising:
a road surface condition determiner for determining whether a road surface condition is a first road surface condition or a second road surface condition in which the drive wheel is more likely to slip than in the first road surface condition, wherein
the condition determiner executes the fraction control during a period of time from when the monitored value meets a first control start condition until the monitored value meets a first control termination condition when the road surface condition determiner determines that the road surface condition is the first road surface condition;
the condition determiner executes the fraction control during a period of time from when the monitored value meets a second control start condition until the monitored value meets a second control termination condition when the road surface condition determiner determines that the road surface condition is the second road surface condition; and
the first control termination condition is set to change more greatly according to the vehicle state than the second control termination condition.

5. The fraction control system in the vehicle according to claim 1,
wherein the controller increases the driving power gradually with a lapse of time after the monitored value meets the control termination condition and then terminates the traction control.

6. The fraction control system according to claim 1, wherein the vehicle is a straddle-type vehicle.

7. The fraction control system according to claim 1,
wherein the driving state includes an acceleration command value or a rotational speed of a driving power source.

8. The fraction control system according to claim 1,
wherein the slip determination factor used for setting the control start threshold is different from the slip determination factor used for setting the control termination threshold.

9. The fraction control system according to claim 1,
wherein the slip determination factor used for setting the control start threshold is larger in number than the slip determination factor used for setting the control termination threshold.

10. The traction control system in the vehicle according to claim 1,
wherein the slip determination factor includes a sensitive factor indicating a temporal difference value between instantaneous values of the vehicle state and an insensitive factor indicating an instantaneous value of the vehicle state or a temporal integration value of instantaneous values of the vehicle state; and the control start threshold and the control termination threshold are set such that the control start threshold is affected more greatly by the sensitive factor rather than the insensitive factor, than the control termination threshold.

11. The fraction control system in the vehicle according to claim 10, wherein the instantaneous value of the vehicle state is at least one of an acceleration command value, a rotational speed of a driving power source, the monitored value, and a vehicle speed.

12. The traction control system in the vehicle according to claim 10,
wherein the control start threshold is set to decrease as a value of the sensitive factor increases.

13. The fraction control system according to claim 10,
wherein the control termination threshold is set variably based on only the insensitive factor.

14. The fraction control system according to claim 10,
wherein the control termination threshold is set based on an acceleration command value included in the insensitive factor.

15. A vehicle comprising a traction control system including:
a detector for detecting a monitored value which changes according to a degree to which a drive wheel slips;
a condition determiner for determining whether or not the monitored value detected by the detector meets a control start condition of traction control and whether or not the monitored value detected by the detector meets a control termination condition of the traction control; and
a controller for executing the traction control to reduce a driving power of the drive wheel during a period of time from when the condition determiner determines that the monitored value meets the control start condition until the condition determiner determines that the monitored value meets the control termination condition;
wherein the control start condition and the control termination condition are independently set;
wherein the condition determiner being configured to set at least the control start condition variably based on a slip determination factor which changes according to a vehicle state; and
wherein the slip determination factor includes a difference value between a current value and a past value of at least one of a throttle valve opening degree, an engine speed, and a slip ratio.

16. The vehicle according to claim 15,
wherein the condition determiner sets the control termination condition variably based on the slip determination factor which changes according to the vehicle state; and
wherein the slip determination factor used for setting the control termination condition includes a current value used to derive the difference value as the slip determination factor for the control start condition.

17. The vehicle according to claim 15,
wherein the condition determiner sets the control termination condition variably based on the slip determination factor which changes according to the vehicle state; and
wherein the slip determination factor used for setting the control termination condition includes a delay calculation value using a current value and a past value which change according to the vehicle state.

18. The vehicle according to claim 15,
wherein the condition determiner sets the control termination condition variably based on the slip determination factor which changes according to vehicle state; and wherein the slip determination factor used for setting the control termination condition does not include a difference value between a current value and a past value which change according to the vehicle state.

19. The vehicle according to claim 15,
wherein the control start condition includes a condition in which the monitored value is greater than or equal to a control start threshold; and
wherein the controller is configured to continue the traction control even when the monitored value becomes smaller than the control start threshold to prevent a magnitude relationship between the monitored value and the control start threshold from affecting the traction control, during a state in which the traction control is executed.

20. A traction control method for use with a vehicle comprising:
detecting a monitored value which changes according to a degree to which a drive wheel slips;
determining whether or not the monitored value detected in the detecting step meets a control start condition of fraction control and whether or not the monitored value detected in the detecting step meets a control termination condition of the fraction control; and
executing the traction control to reduce a driving power of the drive wheel during a period of time from when it is determined that the monitored value meets the control start condition in the determination step until it is determined that the monitored value meets the control termination condition in the determination step;
wherein the control start condition is a condition in which the monitored value is greater than or equal to a control start threshold, the control termination condition is a condition in which the monitored value is less than a control termination threshold, and the control start threshold and the control termination threshold are set according to formulas which are independent of each other;
wherein in the determination step, each of the formula used for setting the control start threshold and the formula used for setting the control termination threshold is set variably based on a slip determination factor which changes according to a vehicle state; and
the slip determination factor including a sensitive factor indicating a temporal difference value between instantaneous values of the vehicle state and an insensitive factor indicating an instantaneous value of the vehicle state or a temporal integration value of instantaneous values of the vehicle state, and the instantaneous values including a driving state value of the vehicle or a slip ratio.

* * * * *

UNITED STATES PATENT AND TRADEMARK OFFICE
CERTIFICATE OF CORRECTION

PATENT NO. : 9,227,603 B2
APPLICATION NO. : 13/187361
DATED : January 5, 2016
INVENTOR(S) : Yoshimoto Matsuda It is certified that error appears in the above-identified patent and that said Letters Patent is hereby corrected as shown below:

In the claims, column 23, line 6, claim 3 delete "fraction" and insert --traction-- and;

column 23, line 37, claim 5 delete "fraction" and insert --traction-- and;

column 23, line 43, claim 6 delete "fraction" and insert --traction-- and;

column 23, line 45, claim 7 delete "fraction" and insert --traction-- and;

column 23, line 49, claim 8 delete "fraction" and insert --traction-- and;

column 23, line 54, claim 9 delete "fraction" and insert --traction-- and;

column 24, line 6, claim 11 delete "fraction" and insert --traction-- and;

column 24, line 15, claim 13 delete "fraction" and insert --traction-- and;

column 24, line 18, claim 14 delete "fraction" and insert --traction--.

Signed and Sealed this
Nineteenth Day of April, 2016

Michelle K. Lee
*Director of the United States Patent and Trademark Office*